United States Patent
Tarozzi et al.

(10) Patent No.: US 12,030,327 B2
(45) Date of Patent: Jul. 9, 2024

(54) MODULAR PRINTING MACHINE FOR CERAMIC PRODUCTS

(71) Applicant: Projecta Engineering S.r.L., Fiorano Modenese (IT)

(72) Inventors: Fabio Tarozzi, Formigine (IT); Francesco Casoni, Formigine (IT)

(73) Assignee: Projecta Engineering S.r.L., Fiorano Modenese (IT)

( * ) Notice: Subject to any disclaimer, the term of this patent is extended or adjusted under 35 U.S.C. 154(b) by 725 days.

(21) Appl. No.: 17/274,353

(22) PCT Filed: Aug. 12, 2019

(86) PCT No.: PCT/IB2019/056834
§ 371 (c)(1),
(2) Date: Mar. 8, 2021

(87) PCT Pub. No.: WO2020/031162
PCT Pub. Date: Feb. 13, 2020

(65) Prior Publication Data
US 2022/0176713 A1  Jun. 9, 2022

(30) Foreign Application Priority Data

Aug. 10, 2018  (IT) .................. 102018000008069

(51) Int. Cl.
*B41J 3/407* (2006.01)
*B28B 11/00* (2006.01)
*B28B 11/04* (2006.01)

(52) U.S. Cl.
CPC ............ *B41J 3/407* (2013.01); *B28B 11/001* (2013.01); *B28B 11/048* (2013.01)

(58) Field of Classification Search
USPC .............. 118/313, 315, 324, 302; 347/22–36
See application file for complete search history.

(56) References Cited

U.S. PATENT DOCUMENTS

2006/0079358 A1* 4/2006 Igarashi ............ G03G 21/1853
474/85
2012/0147092 A1  6/2012 Achatz et al.
(Continued)

FOREIGN PATENT DOCUMENTS

| EP | 1038689 A1 | 9/2000 |
|---|---|---|
| WO | 2016108199 A | 7/2016 |
| WO | 2016203299 A | 12/2016 |

OTHER PUBLICATIONS

International Search Report for PCT/IB2019/056834 dated Nov. 19, 2019 (5 pages).

*Primary Examiner* — Yewebdar T Tadesse
(74) *Attorney, Agent, or Firm* — ASLAN LAW, P.C.

(57) ABSTRACT

A digital printer machine for ceramic products, including at least one conveyor, suitable for transporting the products to be printed along a feed direction, and at least one printing module, positioned along said conveyor and comprising an operating unit with respective print heads provided with nozzles for dispensing at least one printing fluid to be deposited on the surface of the products. The printing module includes a basement provided with a recess (R), underlying the operating unit, wherein the conveyor is inserted to make the products pass under the heads; the basement further comprises two completely flat and free lateral opposite flanks, so that the printing module can be matched to other modules along the conveyor until a complete mutual matching is obtained.

21 Claims, 12 Drawing Sheets

(56) References Cited

U.S. PATENT DOCUMENTS

2013/0293633 A1  11/2013 Li et al.
2017/0341374 A1  11/2017 Nishiyama et al.
2018/0111288 A1   4/2018 Palumbo

* cited by examiner

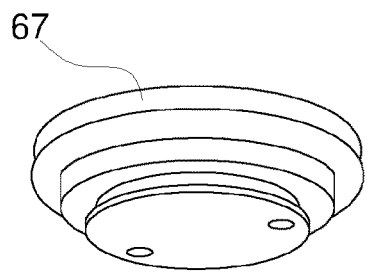
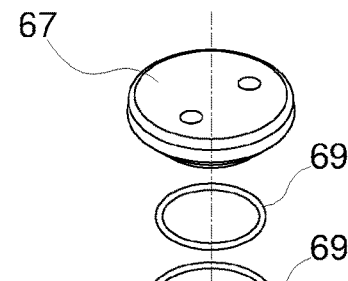
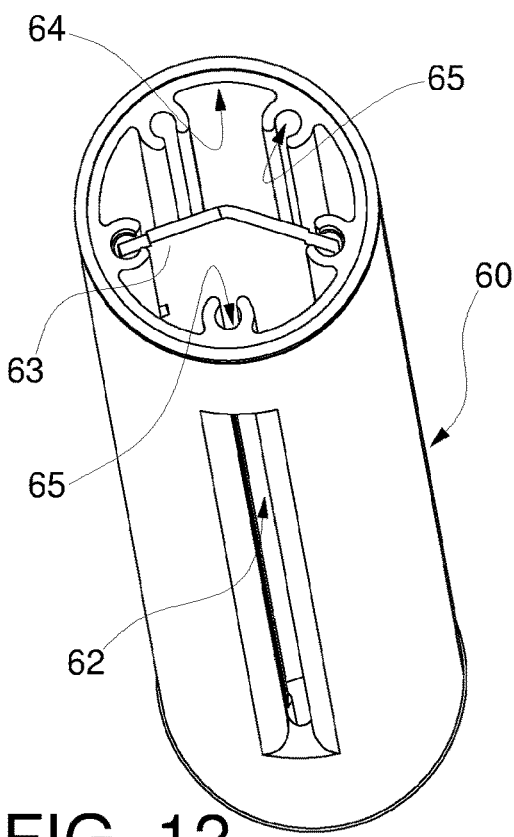
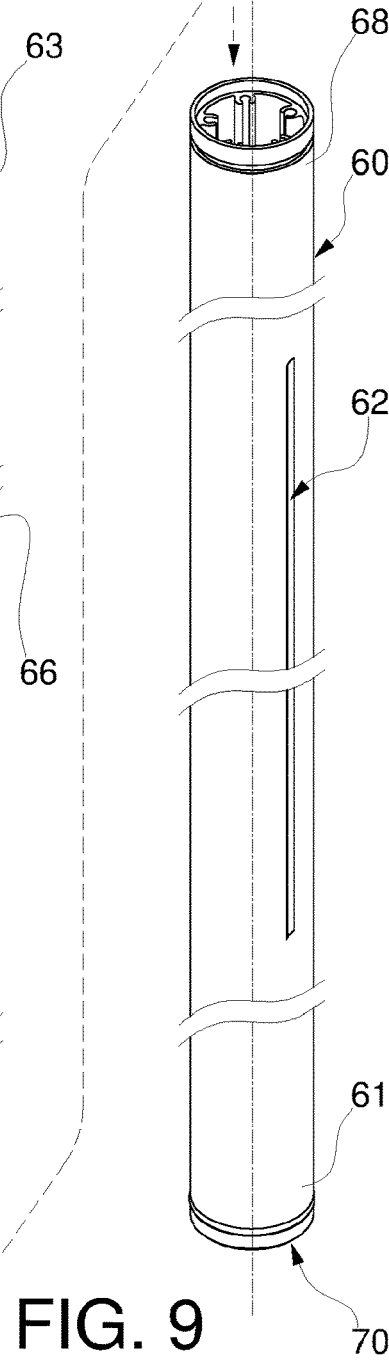
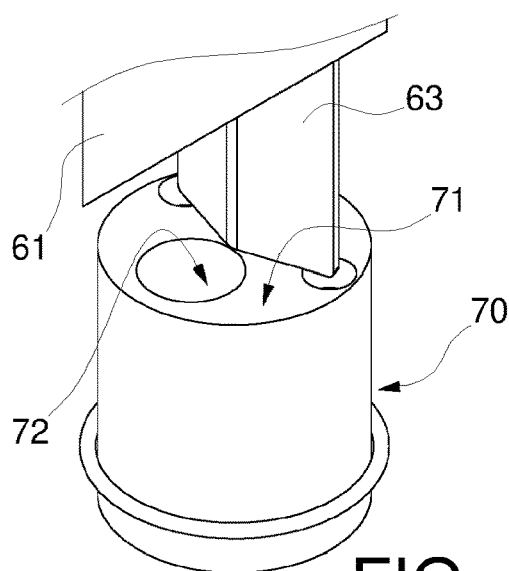

MODULAR PRINTING MACHINE FOR CERAMIC PRODUCTS

TECHNICAL FIELD

The present invention relates to a modular inkjet printer machine for ceramic products.

More particularly, the present invention relates to a modular inkjet printer machine for products such as: ceramic tiles, ceramic materials in general, and also wood, fabric, or other similar materials.

In the following disclosure we will explicitly refer to ceramic tiles.

However, it is emphasized that the teachings of the present invention can be indifferently used also for the decoration of wood, or fabric, or any other material suitable for being treated on the surface by means of the inkjet technique.

BACKGROUND ART

In the ceramic tile production industry, decoration lines which apply inks and/or enamels to the surface of the ceramic support are usually used, suitable for creating both a certain aesthetic and decorative effect and a functional result of protection and coverage of the support itself.

Currently, the so-called machines for inkjet decoration are increasingly used in the field.

These machines apply ink and/or enamel on the ceramic support—normally a flat or substantially flat support, such as a tile—by means of heads which dispense a jet made by nozzles with piezoelectric or other type control, whose actuation and regulation are digitally controlled for the purposes of the decorative process.

The machines for inkjet decoration allow to obtain a very high graphic resolution in the application of the decorative and/or protective product on the interested surface, also simulating decorations of natural materials such as marble, granite, wood and the like.

The machines for inkjet decoration normally comprise a printing area of ceramic products which is composed of a plurality of flanked colour bars.

Each colour bar is equipped with ink or enamel dispensing heads on the interested surface of the products.

Each colour bar then comprises feeding means, to said dispensing heads, of a single type of ink or enamel; for example, each element is suitable for dispensing an ink of a certain colour on the interested surface.

Initially, machines for inkjet decoration were proposed to decorate the products with some colours, that is with a number of colours given by the corresponding number of printing colour bars, the number of colour bars could start from two to get to four, or six and possibly even eight colour bars.

These machines therefore included a maximum number of housings for the colour bars which could be present or not and, once the maximum number of colour bars in the housings was reached, it was not possible to further increase the number of colour bars.

In patent applications WO-2016/108199 and WO-2016/203299 in the name of the same Applicant, a more versatile machine has been proposed with respect to the above-mentioned machines, this machine is equipped with a conveyor belt and a plurality of decoration modules, or colour bars, completely independent of each other.

The modules are positioned above the conveyor belt and flanked to each other along the feed direction of the products.

In this machine, since the decoration modules are independent, all the components necessary for the operation of the module itself must be provided, the means for feeding decoration fluid, the components of the electrical supply, transformer, UPS, etc.; each module must be enclosed with a protective casing and with a certain degree of isolation from external contaminating agents and temperature.

Ultimately, many parts of the machine are repeated in each module thus increasing the complexity and cost of the machine itself.

Therefore, there is a need of a machine that is flexible and adaptable to different production requirements, with a more limited cost and less complexity.

SUMMARY OF THE INVENTION

The technical task of the present invention is to improve the state of the art.

Within the scope of such technical task, it is an object of the present invention to realise a digital printer machine for ceramic products which allows to overcome the above-mentioned drawbacks.

Another object of the present invention is to devise a digital printer machine for ceramic products that is more versatile than the machines currently available on the market.

A further object of the present invention is to provide a digital printer machine for ceramic products which allows the user of the machine to obtain savings in terms of energy resources, maintenance of parts, and the like.

Still another object of the present invention is to provide a digital printer machine for ceramic products which allows to preserve the heads which may not be operating during a certain decoration job.

This aim and these objects are achieved by the digital printer machine for ceramic products according to the present application.

The machine comprises at least one conveyor, suitable for transporting the products to be printed along a feed direction, and at least one printing module, positioned along the conveyor and comprising an operating unit with respective print heads provided with nozzles for dispensing at least one printing fluid to be deposited on the surface of the products.

According to an aspect of the invention, the aforesaid printing module comprises a basement provided with a recess, underlying the operating unit, in which the conveyor is inserted to let the products pass under the heads.

Furthermore, the basement comprises two completely flat and free opposite lateral flanks, so that the printing module can be matched to other modules along the conveyor until a complete mutual matching is obtained.

In one embodiment of the invention of particular practical interest, the machine comprises a plurality of the above-mentioned printing modules, matched together in series along the conveyor, with the flanks of the respective basements mutually matching.

Moreover, each of the printing modules comprises an operating unit, positioned above the conveyor, comprising in turn a plurality of printing bars, functionally autonomous, flanked along the feed direction of the products and each suitable for dispensing, on the surface of the products being processed, a respective printing fluid.

For example, in one embodiment of the invention of particular practical interest, each printing module comprises four printing bars, which are functionally autonomous but joined in a single mobile structure that can be positioned as desired.

Thus, for example, machines can be made which comprise a total of four, eight, or twelve colours, respectively by joining up to three printing modules each provided with four printing bars, anyway, obtaining a very compact solution.

Currently, with machines of the known type, the same result can be obtained, for example, by combining an eight-colour machine with a four-colour machine, but the electrical panels and the structures of the product transport system of each of the machines prevent a compact matching.

According to a further aspect of the invention, the machine comprises a lifting system of each of the printing bars to allow to insert, below it, a collection tank for the printing fluid which is purged during the cleaning cycle of the heads.

The lifting system is devised in such a way that the environment in which the heads are located during the cleaning cycle remains clean, light free and at optimal temperature and humidity conditions.

It is also proposed, within the scope of the present invention, an innovative system which allows a damaged or worn belt of the conveyor to be quickly and easily replaced.

The present application refers to preferred and advantageous embodiments of the invention.

BRIEF DESCRIPTION OF THE DRAWINGS

The features of the invention will be better understood by anyone skilled in the art from the description below and the accompanying drawings, given as a non-limiting example, wherein:

FIG. 9 is an exploded axonometric view of one of the suction ducts of the machine;

FIG. 10 is an axonometric view of the front closure cap of each suction duct;

FIG. 11 is an axonometric view of the insert of each suction duct;

FIG. 12 is an axonometric view of one of the suction ducts of the machine, with the front closure cap removed;

DETAILED DESCRIPTION OF THE INVENTION

Figure 1:
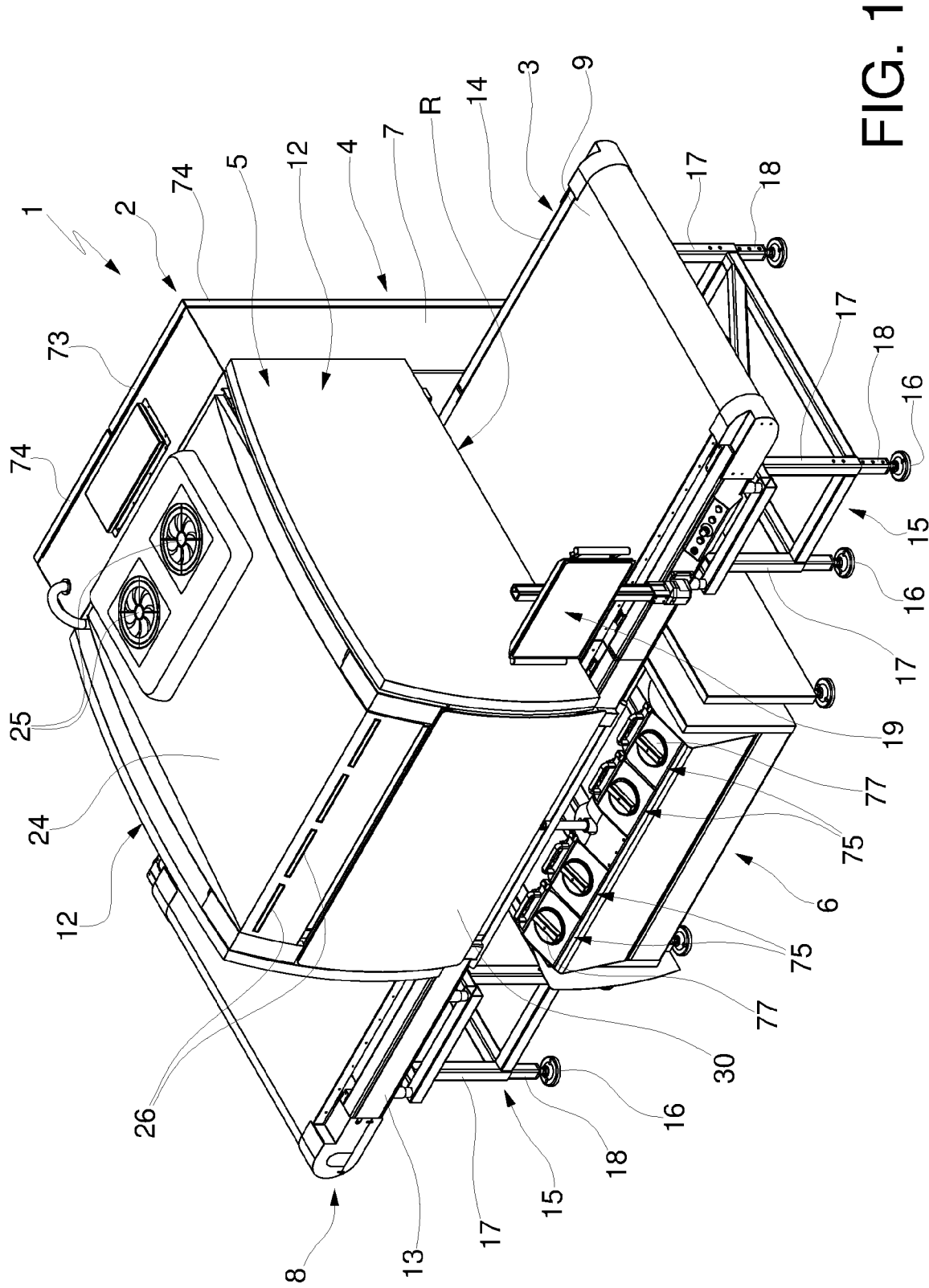
FIG. 1 is an axonometric view of a digital printer machine according to the invention, comprising a single printing module.

With reference to the attached FIG. 1, 1 generally indicates a digital printer machine according to the present invention.

The machine according to the invention is particularly, but not exclusively, intended for the application of decorative and/or protective fluids, such as inks, enamels and the like on products such as ceramic tiles and the like; however, as already mentioned above, the machine 1 according to the invention is of absolutely general use and could also be used for other types of ceramic products, without any limitation.

In addition, it is specified that the printer machine 1 according to the present invention is suitable for the application of fluids such as inks, enamels and the like on ceramic products in any state, that is for example raw or cooked.

In the following disclosure, therefore, it is assumed that the products to be printed/decorated are ceramic tiles of any shape and size.

The machine 1 according to the invention can be installed within a complete line for printing/decorating ceramic tiles, which is assumed to comprise for example other machines of the same type, or possibly also of another type.

In general, the machine 1 comprises at least one printing module 2.

By printing module 2, it is meant a unit that is completely autonomous from the structural and functional point of view, comprising all the mechanical, electronic and hydraulic components necessary to carry out printing jobs emitting one or more printing fluids.

The at least one printing module 2 is suitable for dispensing at least one printing fluid on the products being processed.

The machine 1 further comprises at least one conveyor 3.

The conveyor 3 is arranged to transport the products to be printed/decorated along a certain feed direction, and therefore through at least one printing module 2.

The machine 1 comprises a programmable control unit (for example a PLC, or the like), not shown in the figures, which controls and manages its operation (in particular the coordinated operation of the at least one printing module 2 and of the conveyor 3).

The at least one printing module 2 comprises a basement 4, and an operating unit 5. The operating unit 5 comprises respective print heads provided with nozzles for dispensing at least one printing fluid to be deposited on the surface of the products. According to an aspect of the invention, the basement 4 is provided with a recess R, underlying the operating unit 5, in which the conveyor 3 is inserted to let the products pass under the heads.

In addition, the basement 4 comprises two completely flat and free lateral opposite flanks 12, so that the at least one printing module 2 can be matched to other modules 2 along the conveyor 3, until a complete mutual matching is obtained.

According to the invention, the machine 1 can comprise any number of printing modules 2, associated in series in order to carry out printing jobs in sequence on the products passing through them.

Furthermore, according to the invention, each printing module 2 can be suitable for dispensing a certain number of different printing fluids, as explained in greater detail below.

FIG. 1 shows a machine 1 according to the invention comprising one single printing module 2.

Figure 2:
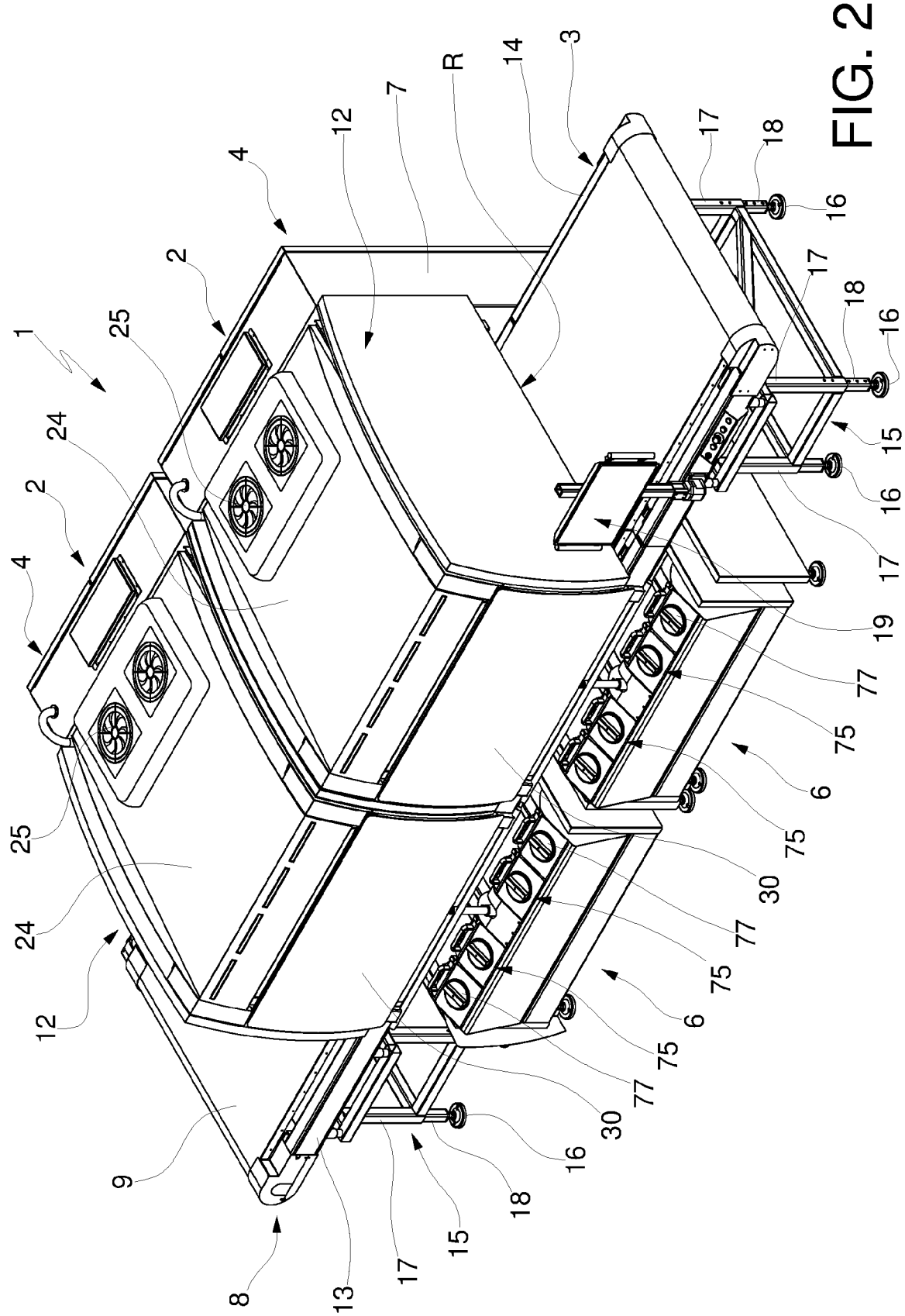
FIG. 2 is an axonometric view of another embodiment of the machine according to the invention, comprising two flanked printing modules.

In FIG. 2, on the other hand, and by way of a non-limiting example only, a machine 1 is shown comprising two printing modules 2 flanked to each other, in order to be crossed by the same conveyor 3.

The basement 4 comprises, more in detail, a ground resting base 6.

Moreover, the basement 4 comprises a shoulder 7, rising from said base 6.

The operating unit 5 is associated with the top of said shoulder 7.

In other words, the base 6, the shoulder 7 and the operating unit 5 constitute a structure which, observed from one side, is substantially shaped like a "C", and which at the centre defines said recess R.

The conveyor 3 is interposed between the base 6 and the operating unit 5 of each printing module 2, that is in the space between the two said parts, which is specifically provided for this purpose.

The conveyor 3 can be fixed to the shoulder 7 of the basement 4.

The conveyor 3 comprises a frame 8 and a belt 9, which allows feeding the products through one or more printing modules 2.

Figure 21:
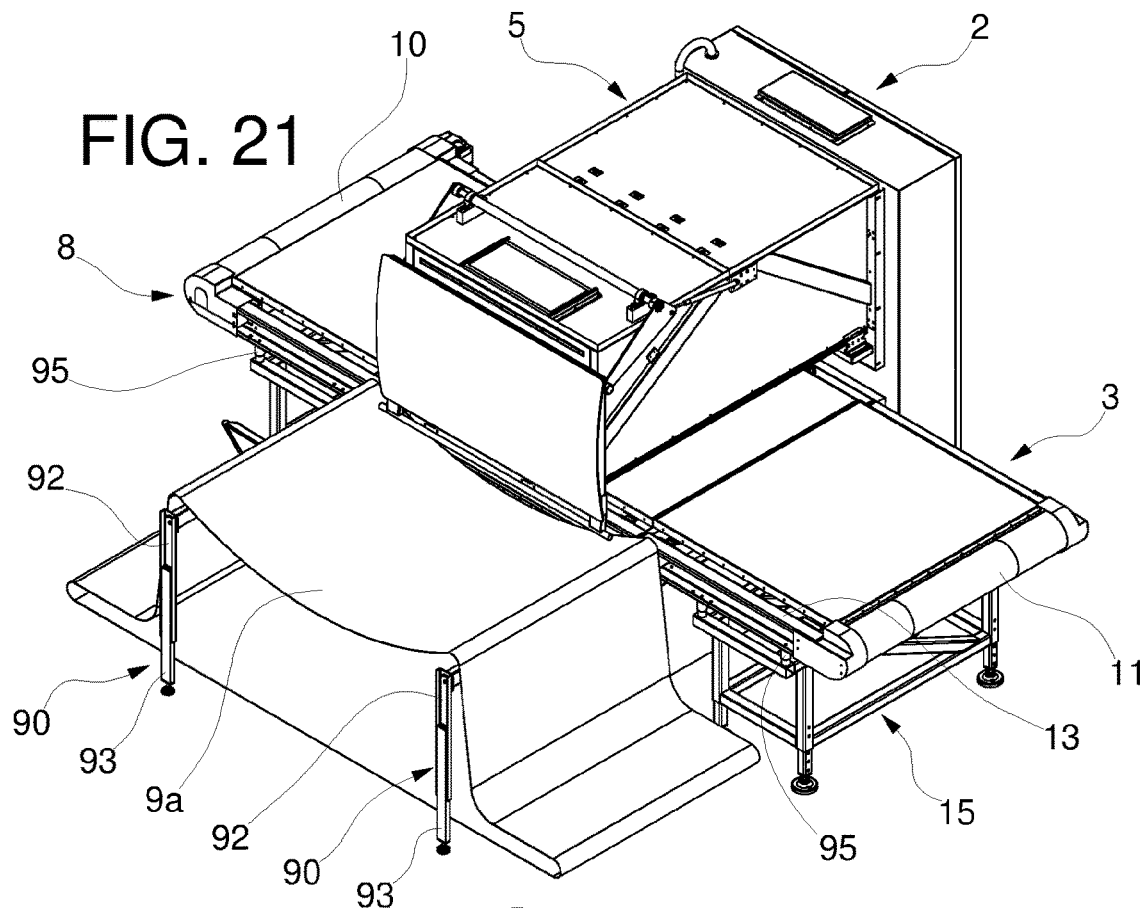
FIG. 21 is an axonometric view of the machine of FIGS. 19, 20, in a stage in which the new belt rests on the extractable supports of the conveyor frame, while the old belt has already been removed.
Figure 22:
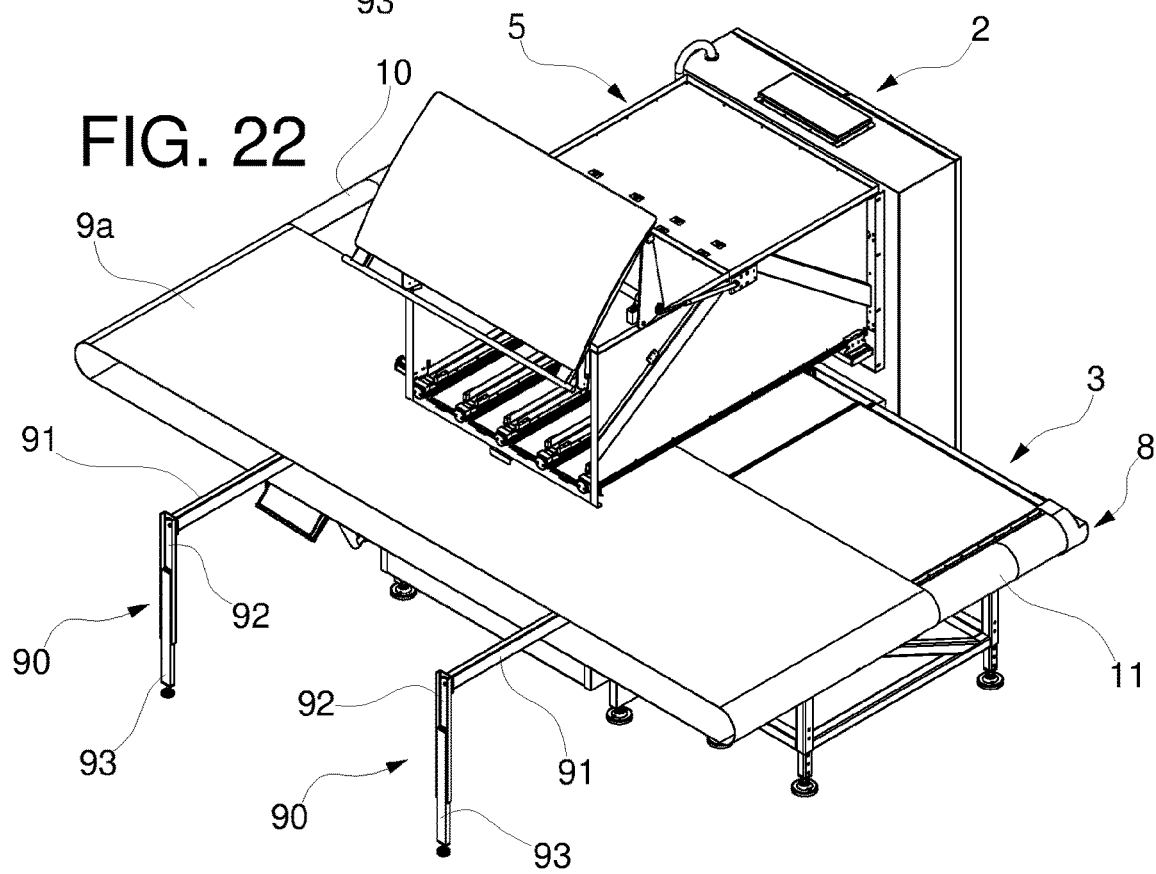
FIG. 22 is an axonometric view of the machine of FIGS. 19-21, in a stage in which the new belt is partially inserted along the rollers of the conveyor.

The belt 9, closed in a loop, is wound around two parallel rollers 10,11 supported in the frame 8 (the rollers 10,11 are visible, in particular, in FIGS. 21,22).

The axes of the two rollers 10,11 are perpendicular to the feed direction of the products being processed.

In particular, a motorized roller 10 and an idler roller 11 are provided; the two rollers are supported at the opposite ends of the frame 8.

As briefly mentioned, according to an important aspect of the present invention, the machine 1 is completely modular. i.e., it can comprise any number of printing modules 2 associated in series, along the feed direction of the products, so as to obtain a particularly effective and advantageous system configuration.

As shown in FIG. 2, flanking two printing modules 2 results in an extremely compact configuration and simple to obtain.

In fact (see FIG. 1), the two opposite lateral flanks 12 of the basement 4 of each printing module 2 are completely flat and free: therefore, the modules 2 can be approached one to the other until a complete mutual matching, and therefore a minimum space configuration, are obtained.

The conveyor 3 can be suitably sized so as to allow the transport of the products to be printed through a certain number of printing modules 2 flanked; for example, with a conveyor 3 of suitable length, four or more printing modules 2 can also be matched.

The frame 8 of the conveyor 3 comprises two sides 13,14, which rotatably support the rollers 10,11; they can be distinguished conventionally in a front side 13 and a rear side 14.

The frame 8 of the conveyor 3 further comprises two lower supporting portions 15. The two lower portions 15 are positioned towards the opposite ends of the conveyor 3, so as to leave, in the centre, the space which is necessary for one or more printing modules 2.

Each of the lower portions 15 rests on feet 16 which are adjustable in height.

More in detail, each of the lower portions 15 comprises a certain number of legs 17 (for example four legs 17), to which the feet 16 are associated inferiorly.

The connection between the feet 16 and the respective legs 17 can be, for example, of the telescopic type: in other words, a rod 18, integral with each foot 16, is slidingly engaged within the respective leg 17.

The height of the foot 16 can be adjusted by selectively locking each of the rods 18 inside the respective leg 17 in the desired position.

Selective locking can be obtained, for example, by means of a pin which can be selectively inserted in a pair of corresponding holes provided both in the leg 17 and in the rod 18.

It is a fast and practical adjustment, which allows to easily carry the transport plane of the belt 9 to the desired height.

Furthermore, each foot 16 is associated with the respective rod 18 by means of a screw connection, which allows fine adjustments to be made (for example, to compensate for any unevenness in the floor).

The lower portions 15 of the frame 8 of the conveyor 3 can be made by means of a light reticular structure, comprising pillars, crosspieces, longitudinal members.

The frame 8 of the conveyor 3 can also comprise a control unit 19 (for example a PLC), for managing the movement of the belt 9, of the various sensors provided, etc.

The control unit 19 of the conveyor can also be the same that manages the operation of the various printing modules 2 of the machine 1, or it can be a separate and dedicated unit.

The control unit 19, with its own user interface 20, can be installed on an arm 21 connected to the front side 13 of the frame 8 of the conveyor 3.

Figure 19:
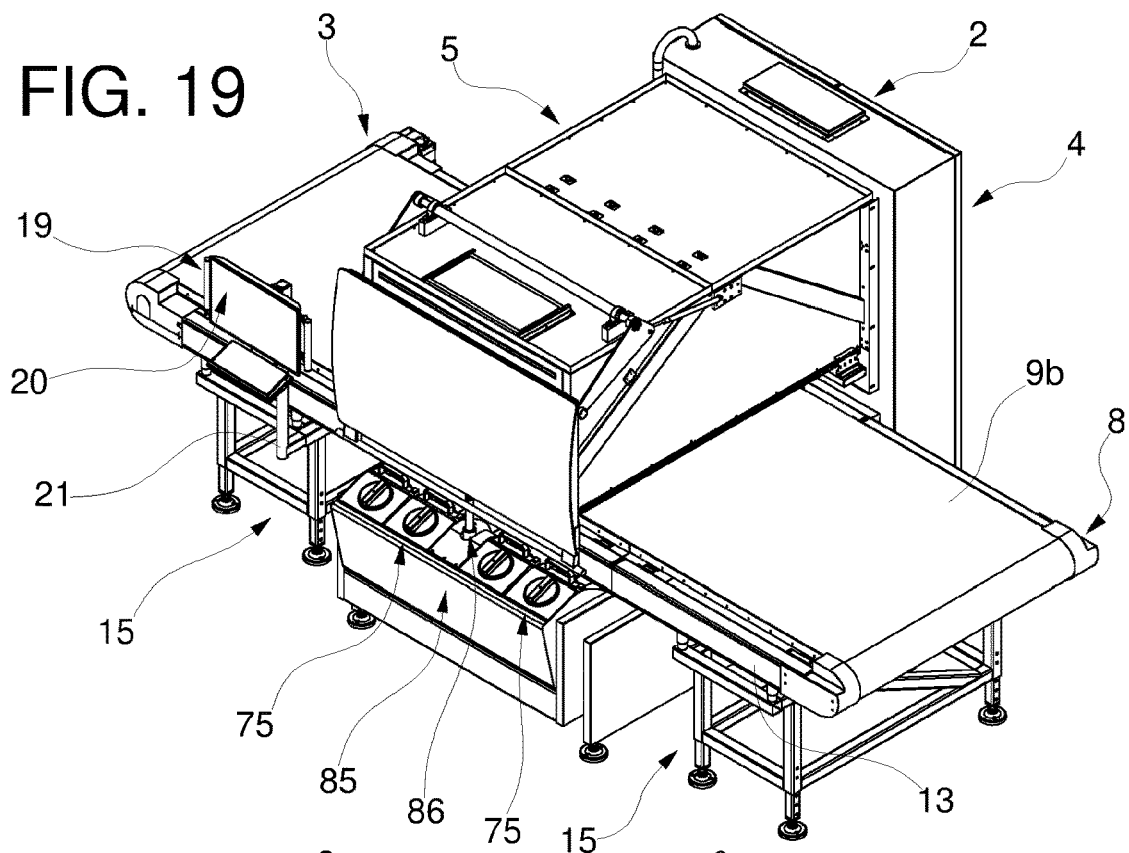
FIG. 19 is an axonometric view of the machine, with some parts removed, at an early stage of the replacing process of the belt of the conveyor.
Figure 20:
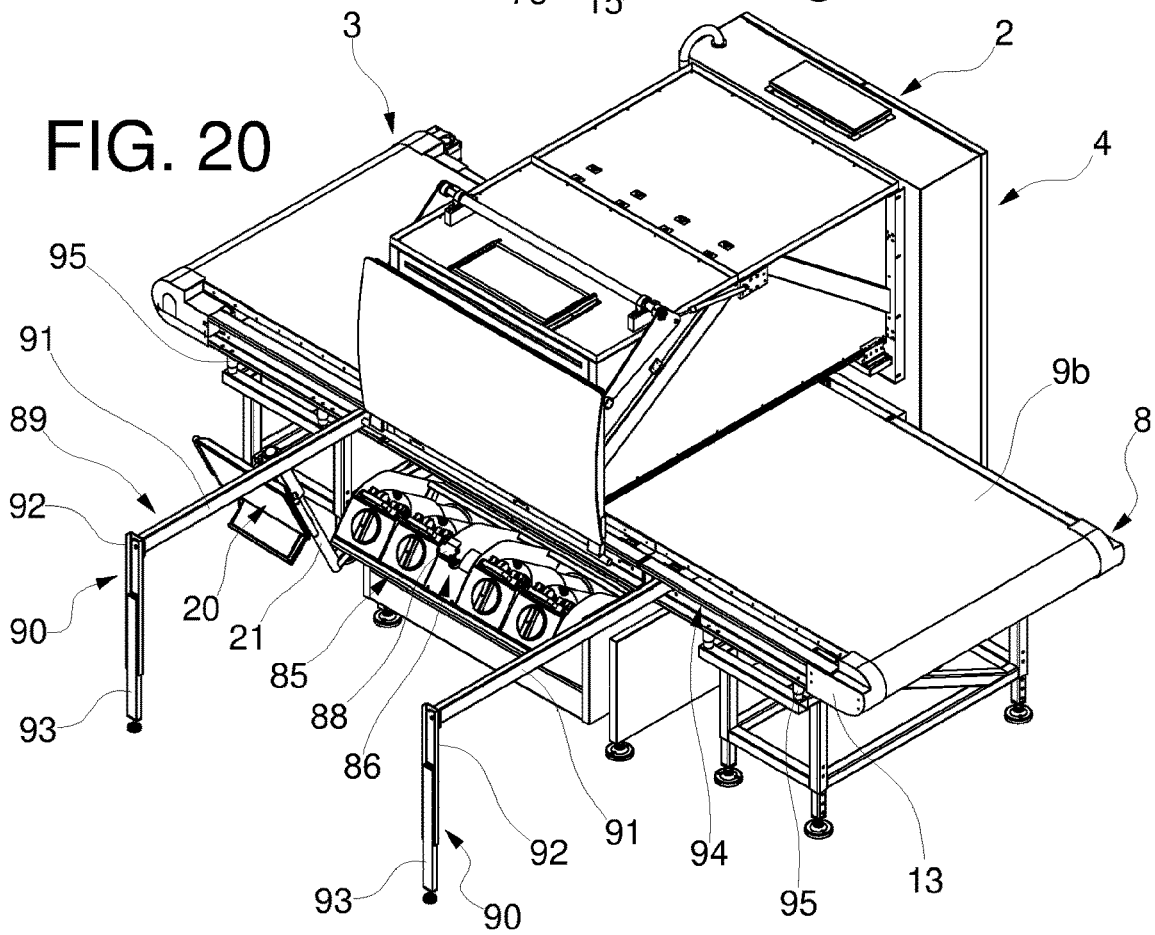
FIG. 20 is an axonometric view of the machine of FIG. 19, in a stage in which extractable supports have been provided for the new belt to be installed.

The arm 21 can be tilting, and therefore rotatable from an operating position (FIG. 19) to an inactive position (FIG. 20).

According to another aspect of the invention, the operating unit 5 of each printing module 2 comprises a plurality of printing bars 22, flanked along the feed direction of the products; each printing bar 22 is suitable for dispensing, on the surface of the products being processed, a respective printing fluid.

There can be any number of printing bars 22 within the operating unit 5 of each printing module 2.

In the embodiment of the invention shown in the figures, the operating unit 5 of each printing module 2 comprises four printing bars 22, flanked along the feed direction of the products.

In one embodiment of the invention of particular practical interest, said printing bars 22 are suitable for dispensing respective inks of different colours (for example, the four colours of the four-colour system, or even inks of other different colours). However, in other embodiments of the invention, the printing bars 22 could be used to dispense fluids of another type, for example enamels, or the like.

Each of the printing bars 22 is autonomous from the operation point of view.

According to an aspect of the invention, the operating unit 5 of each printing module 2 comprises a supporting structure 23, which houses and supports said printing bars 22 above the conveyor 3.

Figure 3:
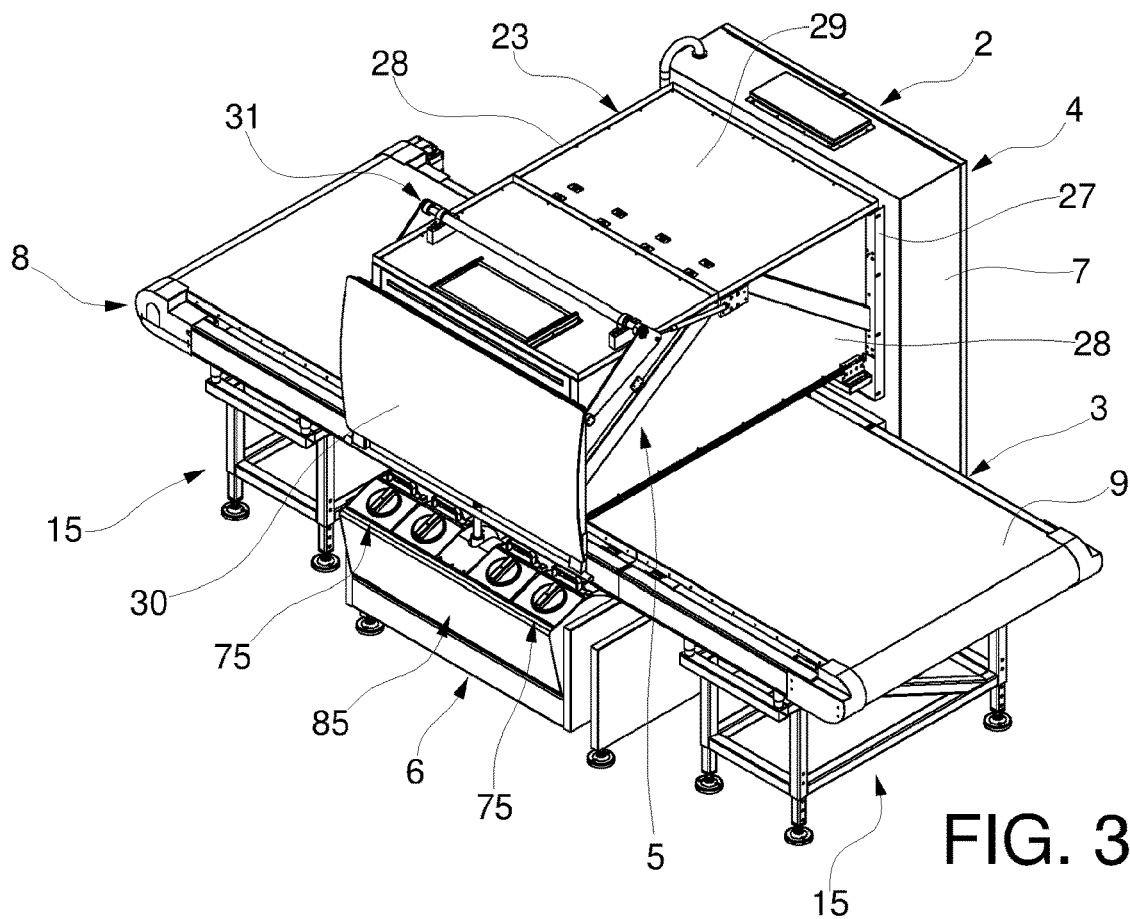
FIG. 3 is an axonometric view of the same machine, with some parts removed for greater clarity.
Figure 4:
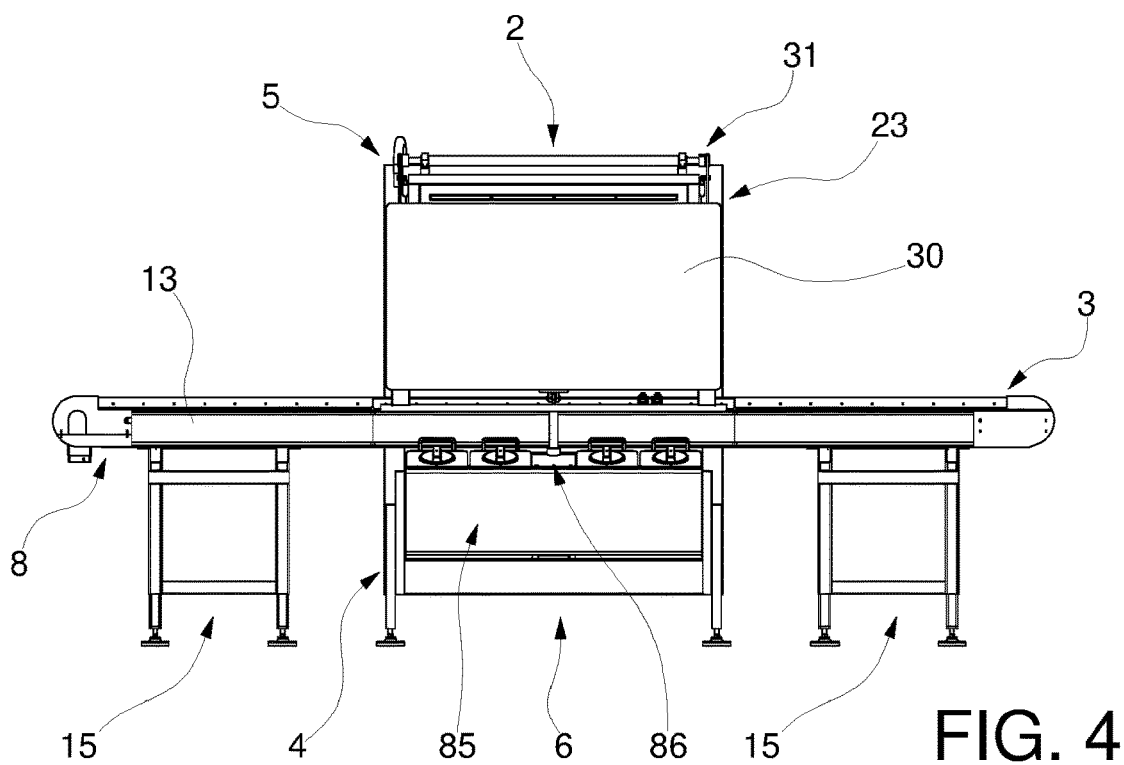
FIG. 4 is a front view of the same machine, with some parts removed.

The supporting structure 23 comprises an external cover 24 for further protection; FIGS. 3, 4 show the machine 1 with the external cover 24 removed, for greater clarity.

The external cover 24 can comprise an opening for housing one or more fans 25, to ventilate the environment inside the operating unit 5, or to air-condition it.

Moreover, the external cover 24 can comprise a very visible LED lights system 26, arranged in correspondence of the respective printing bars 22.

The LED lights 26 are designed to inform the operator about the status of the respective printing bar 22 (for example, stand-by, printing, raised position, alarm, etc.).

The external cover 24 also includes the matching flanks 12 for other printing modules 2.

The supporting structure 23 of the operating unit 5 is fixed to the shoulder 7 of the basement 4; in particular, the supporting structure 23 comprises a back plate 27, arranged, in use, according to a vertical plane, and connected to said shoulder 7.

The supporting structure 23 also comprises lateral walls 28 and a roof 29, which enclose and isolate the environment wherein the printing bars 22 work.

The supporting structure 23 further comprises a front door 30 as well.

The front door 30 allows operators to access the printing bars 22, for example to carry out maintenance operations, or the like.

Figure 5:
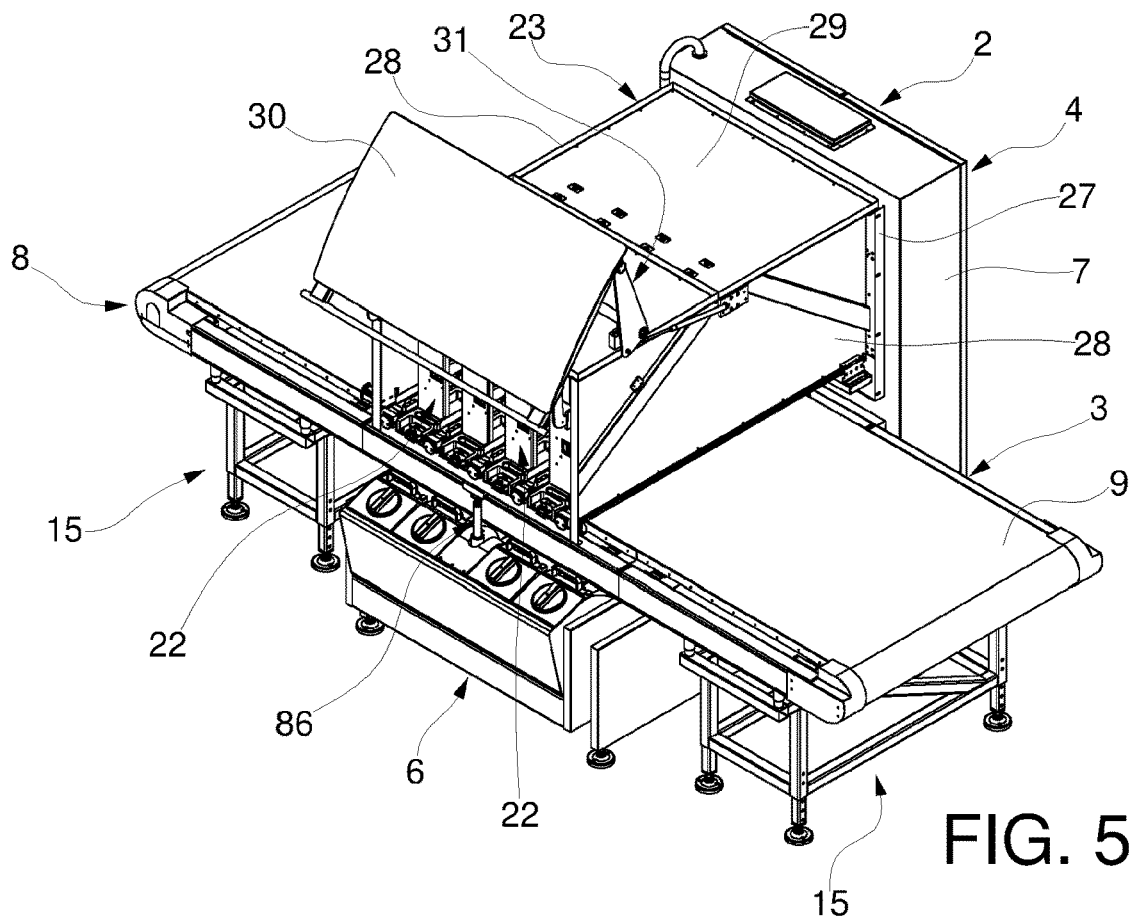
FIG. 5 is an axonometric view of the machine, with some parts removed, and with the front door raised.
Figure 6:
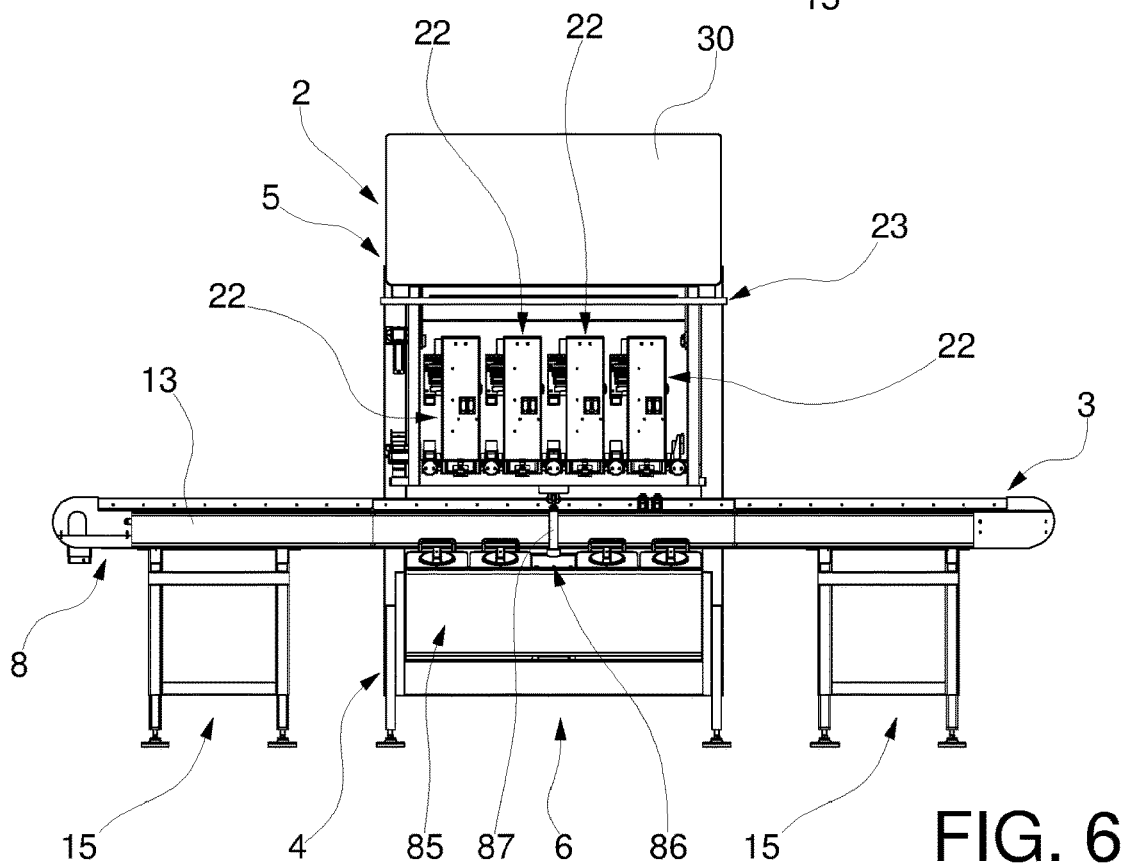
FIG. 6 is a front view of the machine, with some parts removed, and with the front door raised.

As shown in FIGS. 5,6, the front door 30 is associated with an articulated support system 31, which allows it to be raised to a higher position to access the printing bars 22.

Figure 7:
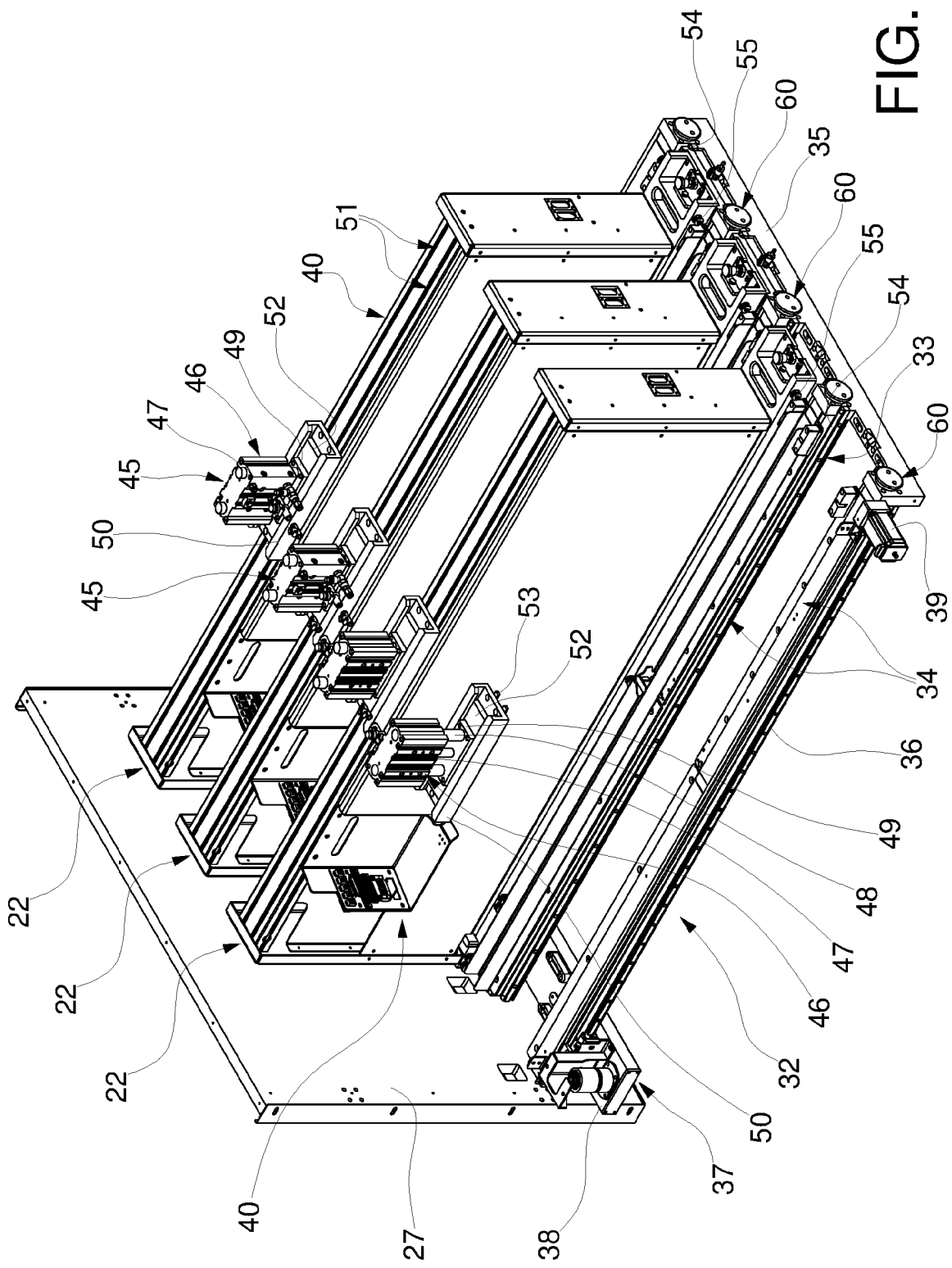
FIG. 7 is a detailed axonometric view of the operating unit of a printing module of the machine, with a printing bar, and other parts removed.
Figure 8:
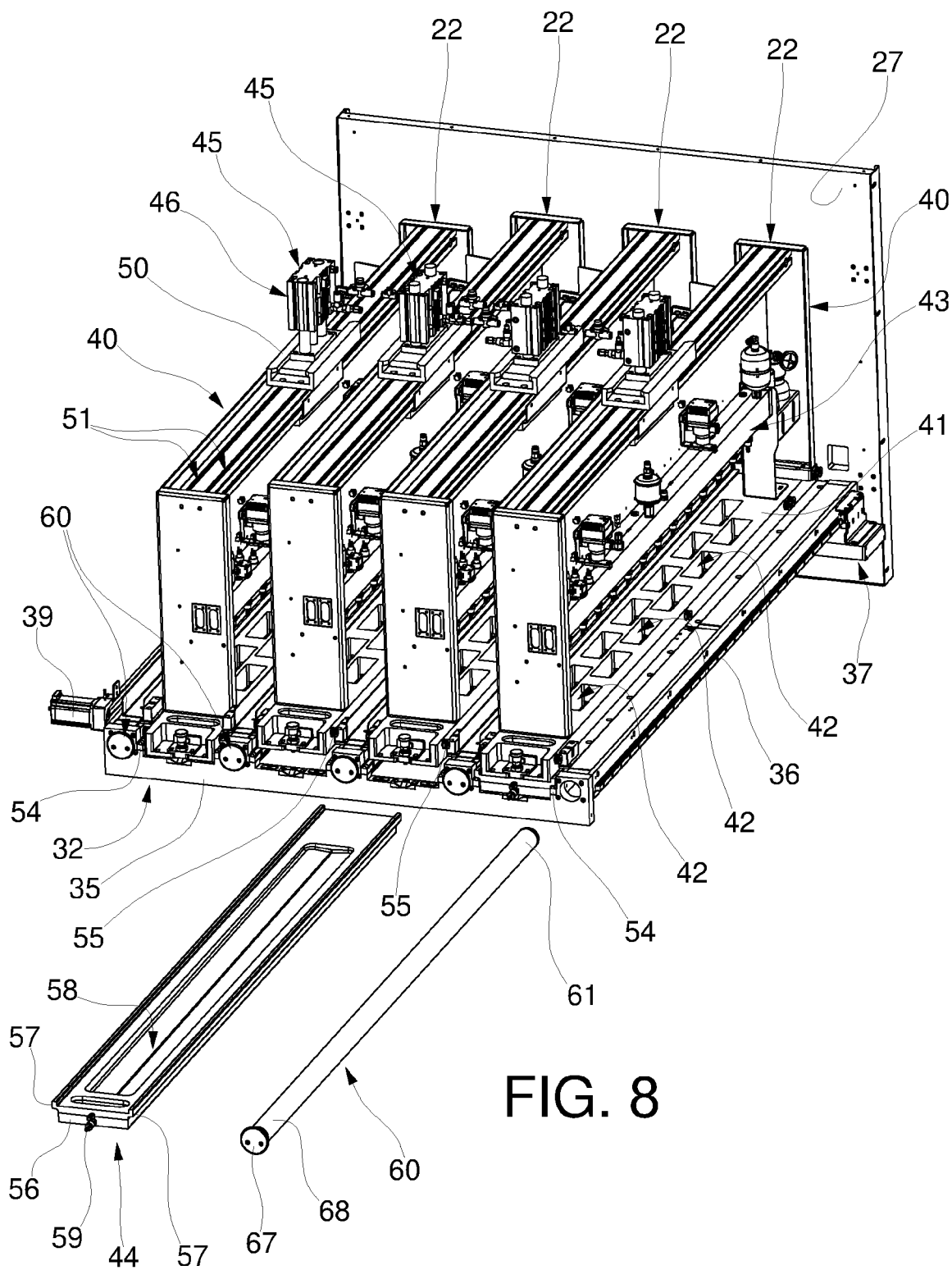
FIG. 8 is a detailed axonometric view, and partially exploded, of the same operating unit, from a different angle.

FIGS. 7, 8 show the operating unit 5 of each printing module 2 in detail, from which the lateral walls 28 and the roof 29 have been removed for greater clarity.

The supporting structure 23 includes a shelf element 32.

The shelf element 32 is associated to the back plate 27.

The shelf element 32 comprises a plurality of openings 33 through which the print heads (not shown in the figures) of each printing bar 22 can protrude inferiorly, so that they can be positioned at the correct distance from the surface of the products being processed.

The openings 33 are defined by a plurality of crossbars 34.

Such crossbars 34 connect the back plate 27 to a front plate 35.

In particular, to obtain four openings 33 corresponding to four printing bars 22, five crossbars 34 are provided, equidistantly spaced along the feed direction of the products.

As previously mentioned, the supporting structure 23, indeed comprising the back plate 27, the lateral walls 28, the roof 29, the shelf element 32 and the front door 30, encloses an environment (wherein the printing bars 22 are housed) which can be put in overpressure, ventilated or conditioned (even with a commercial conditioner).

In fact, for this purpose the front door 30 is provided with gaskets.

In addition, the front door 30 is transparent to allow the operators to see inside the supporting structure 23.

Still referring to FIGS. 7,8, the two outer crossbars 34 are provided with respective guides 36 for a cleaning device 37 of the heads of the printing bars 22. The cleaning device 37 comprises a bar 38, which can be actuated, via an actuator 39, to translate along said guides 36.

The bar 38 is provided with means for cleaning the heads; in particular, the bar 38 comprises (see FIG. 14A) a double row of cleaning plugs 38a fixed offset with the printing bars 22.

The cleaning plugs 38a suck the excess ink deposited on the sides of the printing nozzles of the heads, and the inevitable dirt adhering to them.

The plugs 38a are fixed in a suitably offset position in the same way as the heads on the lower head bearing plate 41 are offset, in order to be able to simultaneously clean the print heads, thus ensuring an identical suction flow for all the heads. According to another aspect of the invention, each of the printing bars 22 comprises a respective supporting framework 40; the framework 40 houses all the components necessary for the correct operation of the printing bar 22.

In other words, each printing bar 22 is completely independent from the others as far as its operation is concerned.

Each framework 40 is slidable with respect to the supporting structure 23, in an orthogonal direction with respect to the feed direction of the products.

Each framework 40 is open at least at one side, to allow maintenance operations to be carried out when the framework 40 itself is extracted from the supporting structure 23 in an extended position outside the dimensions of the supporting structure 23 itself.

The framework 40 can have, for example, a substantially box-like shape.

Each framework 40 comprises a lower head bearing plate 41, provided with seats 42 inside which the respective print heads are housed.

More in particular, the lower head bearing plate 41 support is associated from above with a mount 43, which carries various components necessary for the operation of the printing bar 22.

This mount 43 supports numerous systems and components such as, just to name a few, the control electronics of the heads, the ink feeding and recirculation container, and others.

The operation of each printing bar 22, and the mechanical, hydraulic and electronic components necessary to manage this operation will not be further described, since they are, in general, known in the field. According to an aspect of the invention, each printing bar 22 can be raised inside the supporting structure 23 of the operating unit 5.

In particular, each printing bar 22 can be raised from a lower operating position to an inactive upper position, and vice versa.

According to another aspect of the invention, the machine 1 comprises one or more collection tanks 44 for the maintenance of the heads of each printing bar 22.

The raising of a determined printing bar 22 from the lower operating position to the inactive upper position has the purpose of placing, below it, a respective collection tank 44 for the printing fluid.

The collection tank 44, located below a specific printing bar 22, has the function of collecting the printing fluid emitted by the heads of this bar 22 during a cleaning cycle (purging), or during the execution of other operations provided for restoring optimal operating conditions, for example after a prolonged work cycle.

These maintenance operations are carried out in suitable periods of time in which the printing bar 22 in question is not engaged in any printing work, and in which therefore it can be excluded from the production cycle, for this purpose.

According to this aspect of the invention, therefore, the supporting structure 23 of the operating unit 5 comprises lifting means 45 of each of the printing bars 22, independently of each other.

The lifting means 45 comprise, for each of the printing bars 22, a respective lifting actuator 46, integral with the internal surface of the roof 29 of the supporting structure 23.

Each lifting actuator 46 comprises, more particularly, a fixed portion 47 integral with the roof 29, and a movable portion 48 associated to the top of the framework 40 of the respective printing bar 22.

The lifting actuator 46 can be, for example, of the pneumatic type, where the fixed portion 47 is constituted by the cylinder, while the movable portion 48 is constituted by the stem.

In one embodiment of the invention (illustrated in the attached figures), the lifting actuator 46 can be constituted by a pneumatic cylinder with double stem or triple stem, or in any case of the type comprising an end plate 49 connectable to the member to be handled.

The lifting actuator 46 is connected to the framework 40 of the respective printing bar 22 in a sliding manner, to allow the extraction of the bar (22) itself, for maintenance reasons, in an extended position outside the dimensions of said operating unit (5).

The end plate 49 of the lifting actuator 46 is associated with a skid 50 sliding along upper guides 51 provided along the top of the framework 40 of the respective printing bar 22.

The coupling between the end plate 49 and the skid 50 is substantially of the dovetail type, to allow easy separation between the two parts, if necessary.

More in detail, the end plate 49 is fixed to a counter plate 52: the latter is in turn engaged in a designated seat of the skid 50, defined by two opposite edges folded towards each other (so as to define a substantially C-shaped cross-section).

In turn, the skid 50 comprises respective sliders 53, which can be slidably engaged in the upper guides 51: the coupling between the sliders 53 and the respective upper guides 51 is of the dovetail type.

The supporting structure 23 of the operating unit 5 also comprises lower guides 54 for the sliding of each of the printing bars 22, so as to be able to be extracted in the extended maintenance position outwards.

For this purpose, the lower head bearing plate 41 of each printing bar 22 supports rotatable lateral wheels 55 (in correspondence with both sides) able to roll along said lower guides 54.

In particular, the lateral wheels 55 comprise respective grooves, wherein a shaped upper portion of each of the lower guides 54 engages.

The lower guides 54 arm fixed to the crossbars 34 of the shelf element 32; more in detail, they are provided along the edges of each opening 33 of the shelf element 32.

Therefore, when it is intended to raise a printing bar 22 to insert, below it, a respective collection tank 44, the lateral wheels 55, which simply rest on the lower guides 54, immediately detach from the latter.

According to another aspect of the invention, each of the collection tanks 44 comprises a main portion 56 and two opposite lateral edges 57 protruding laterally from the main portion 56.

The main portion 56 comprises a cavity 58, arranged to collect the fluid emitted by the print heads during the purging/maintenance operations.

The cavity 58 communicates with a discharge channel which, in turn, opens into an orifice, which can be plugged or regulated by a tap 59.

Moreover, the lateral edges 57 are shaped so as to match respectively above the lower guides 54 when the printing bar 22 is in an inactive upper position, and therefore the lateral wheels 55 are detached from the lower guides 54 themselves. According to the invention, the collection tank 44 is shaped so as to obtain several important technical effects.

Firstly, the lower plate 41 of the respective printing bar 22 rests on the collection tank 44 so as to enclose a sealed environment in which there are the heads.

This environment is humid and protected from the entrance of the light, in order to prevent the printing fluid from drying on the heads: the latter therefore remain perfectly efficient, and can purge inside the cavity 58.

The sealing effect in the contact between the lower plate 41 and the collection tank 44 allows, in fact, to separate three distinct environments with respective different microclimates in the operating unit 5.

Below the collection tank 44, there is a dirty and hot-humid environment (i.e., the printing area in which the products pass); inside the collection tank 44 there is a clean and humid environment, without light; finally, above the printing bars 22 there is a clean and conditioned environment.

The latter is a very important aspect, since each area of the machine must operate in its own proper working microclimate, with the right temperature and the right level of humidity, mainly—but not only—to keep all the components in the maximum efficiency conditions.

It should also be added that the lower surface of each collection tank 44, when the latter is inserted below a respective printing bar 22, is at the same height at which the heads in the printing position are located with respect to the plane of the belt 9: therefore, the head cleaning band 38 can operate without limitations and act on the heads that are being printed.

FIGS. 15-18 show the sequence of inserting a collection tank 44 beneath a respective printing bar 22, and therefore the operative sequence for putting said printing bar 22 in a "stand-by" condition in order to carry out the necessary maintenance operations on the respective heads (e.g., purging).

Figure 15:
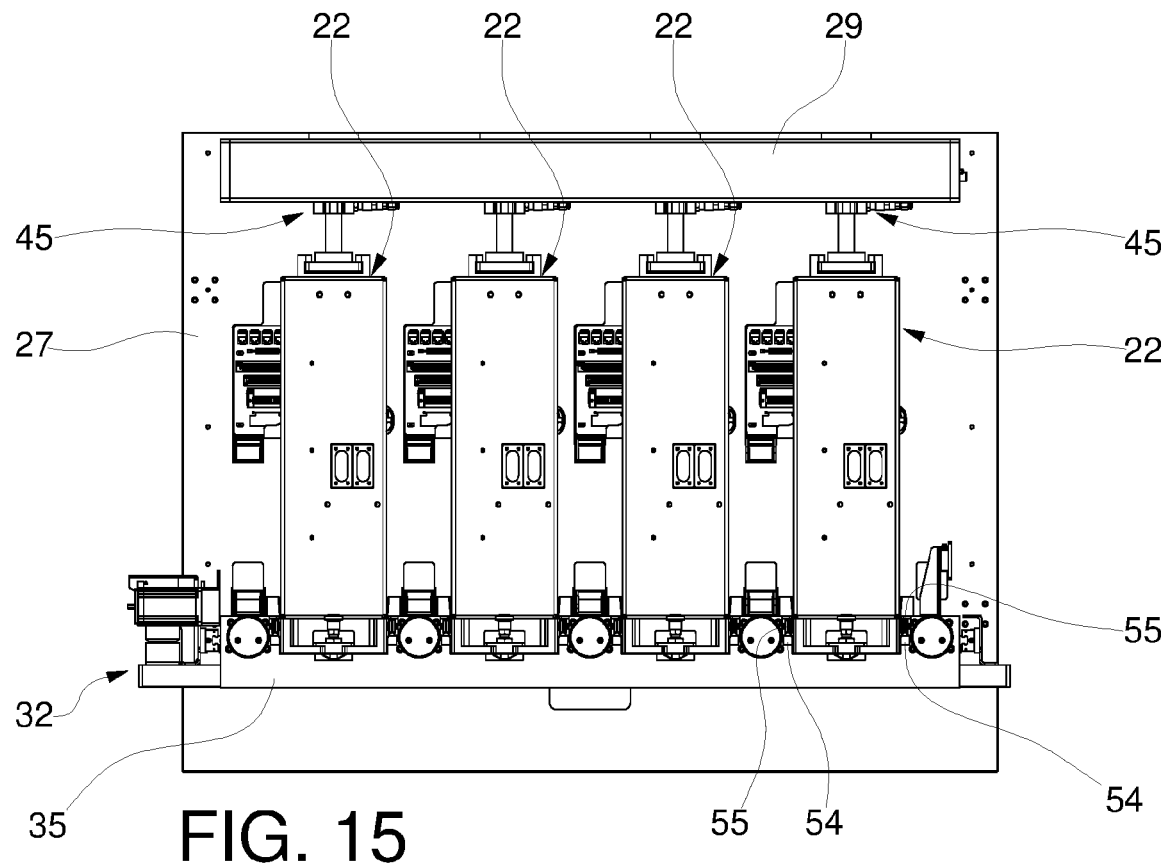
FIG. 15 is a detailed front view of the operating unit of the machine.

In particular, in the situation of FIG. 15, all the printing bars 22 are in the respective lower operative positions. i.e., printing.

Figure 16:
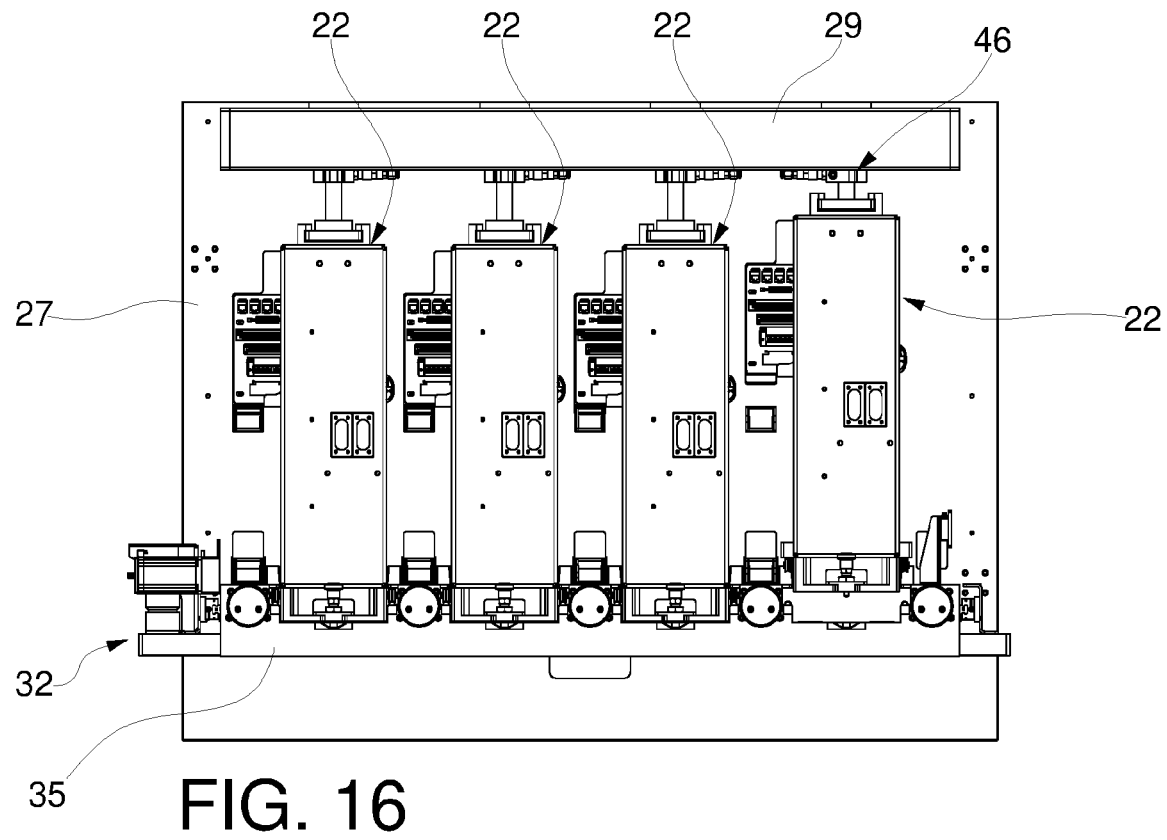
FIG. 16 is a detailed front view of the same operating unit, in a stage in which one of the printing bars is raised to allow the insertion of a respective collection tank.

In the situation of FIG. 16, the printing bar 22 which is more to the right has been raised to the inactive upper position by means of the lifting actuator 46.

Figure 17:
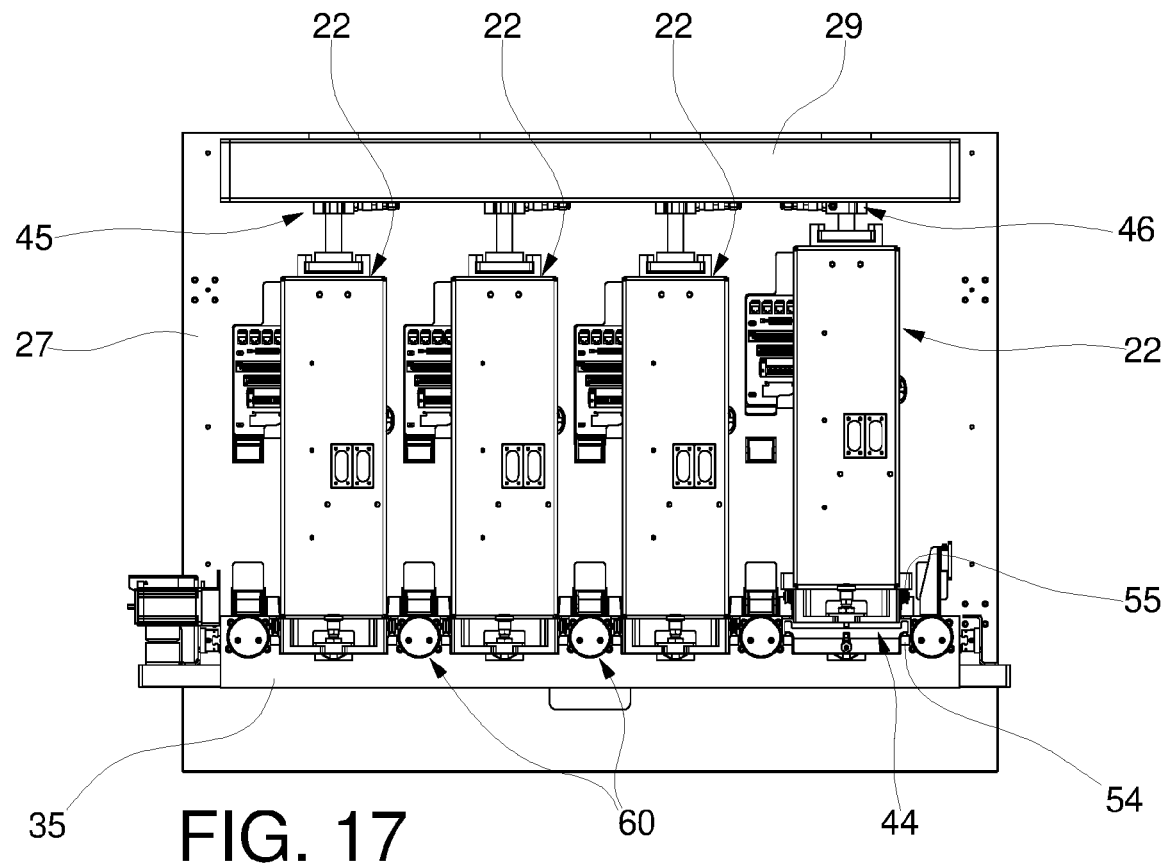
FIG. 17 is a detailed front view of the same operating unit, in a stage in which the collection tank is inserted in the space cleared by the raising of the respective printing bar.

In the situation of FIG. 17, the collection tank 44 has been inserted below the raised printing bar 22 (in particular, resting on the lower guides 54).

Figure 18:
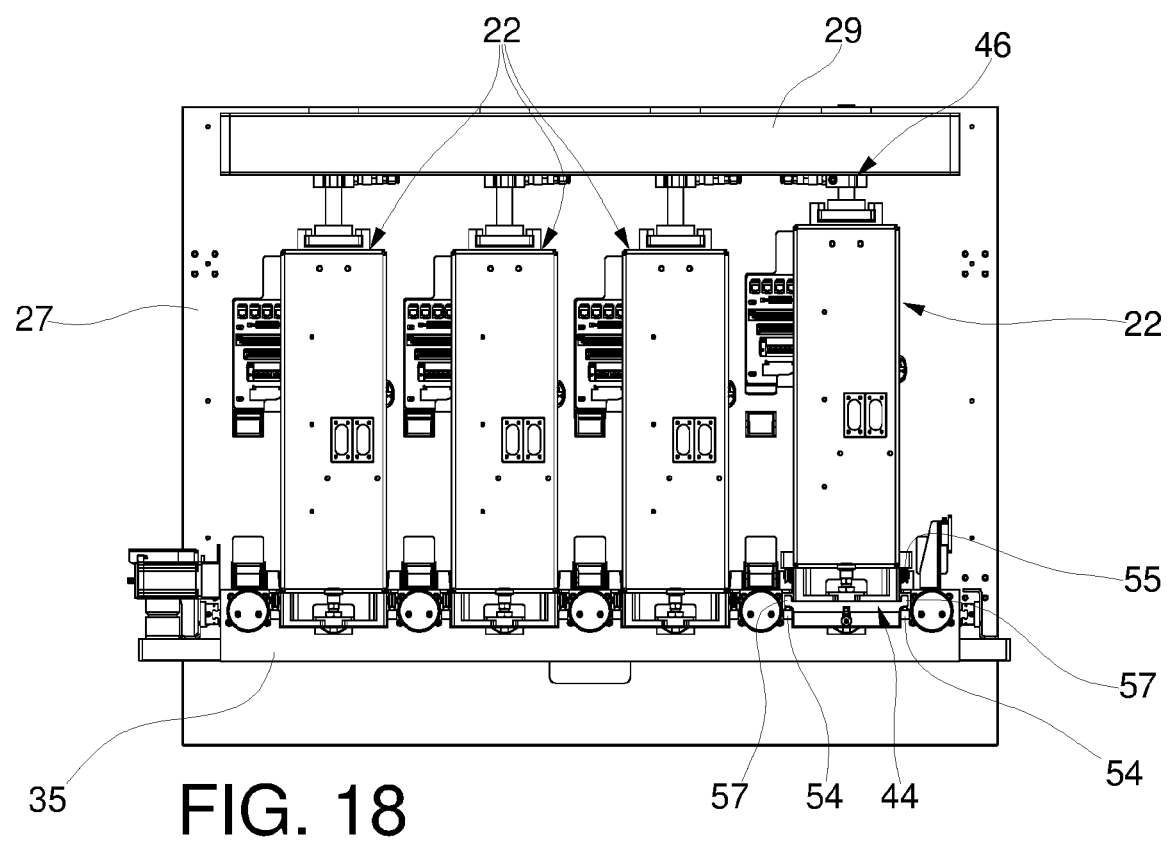
FIG. 18 is a detailed front view of the same operating unit, in a stage in which the printing bar is lowered again, and rests on the respective collection tank.

Finally, in the situation of FIG. 18, the printing bar 22 rests on the collection tank 44, with the above described effects.

The operating phases to put a given printing bar 22 in "stand-by" condition are carried out with the machine stopped and with manual controls, so as to operate with maximum safety.

Said phases are performed in reverse order to return to the normal operating printing condition of the involved bar 22.

It also must be emphasized that, when any of the printing bars 22 is in a "stand-by" condition, there are no variations in weight with respect to the situation in which all the printing bars 22 are operative: consequently, the machine can continue to operate with the remaining bars 22 without fear of deformation or alteration in the printing.

With particular reference to FIGS. 8-12, and according to another aspect of the invention, the operating unit 5 of each printing module 2 comprises a suction system operating in the printing area; this suction system has the function of removing micro-drops of the printing fluid, vapours (also emitted by the products), and other substances and/or corpuscles which are suspended in the printing area, i.e., in the area surrounding the print heads and the products being processed.

Said suction system comprises a plurality of suction ducts 60.

These suction ducts 60 are interposed between the individual printing bars 22. More particularly, the suction ducts 60 are housed inside the crossbars 34 of the shelf element 32.

This is a very advantageous solution from the point of view of the space in the printing area, since the structural elements that support the printing bars 22 are exploited.

In the embodiment illustrated in the figures, therefore, five suction ducts 60 are provided.

Each of the suction ducts 60 is connected, at its proximal end 61 (i.e., the one facing the shoulder 7 of the basement 4), to a vacuum manifold in turn connected to a vacuum generator external to the machine, not represented in the figures for simplicity.

Each of the suction ducts 60, as shown in FIG. 8, can be extracted/removed from the front side of the printing module (2), to carry out cleaning and/or maintenance operations.

Each suction duct 60 has a cross-section, for example, circular, or substantially circular.

Each suction duct 60 comprises at least one through longitudinal slot 62, through which micro-drops, vapours, corpuscles, etc. can be sucked from the printing area and recalled inside the duct 60 itself.

The slot 62 has rounded edges to facilitate a more regular suction flow.

Each suction ducts 60 comprises, within, a septum 63 which divides its internal volume into two parts.

The septum 63 can be removed from the inside of the respective suction duct 60.

To house the respective septum 63, each suction duct 60 shapes, along its inner surface 64, longitudinal seats 65 wherein the lateral edges of the same septum 63 can be selectively inserted.

The longitudinal seats 65 have a substantially C-shaped cross-section each to house a respective lateral edge of the septum 63 as shown in FIG. 12.

Each suction duct 60 can therefore be constituted, for example, by an extruded profile of circular section—of aluminium, or other suitable material—where the longitudinal seats 65 are formed directly along the inner surface 64 in the extrusion process.

The septum 63 consists of a folded foil along a longitudinal fold line (and therefore it has a substantially "V"-shaped cross-section, as shown in FIG. 12).

The septum 63 has some grooves 66 along the lateral edges, for communicating the two parts in which the internal volume of the suction duct 60 is divided.

The shape and length of the grooves 66 is optimized to balance the flow of sucked air so that it is uniform over the entire length of the slot 62.

Each suction duct 60 comprises a respective front closure cap 67 for the mouth of the duct 60 itself corresponding to its distal end 68.

Sealing gaskets 69 can be interposed between the front cap 67 and the mouth of the suction duct 60.

Each suction duct 60 also comprises, at its proximal end 61, an insert 70 which closes the mouth of the duct 60 itself.

The insert 70 has a surface 71 on which it matches the septum 63.

The septum 63 is therefore included, inside the suction duct 60, between the front cap 67 and the insert 70.

The insert 70 also comprises a hole 72 for the passage of the air sucked into the vacuum manifold.

The hole 72 is of a suitable diameter to balance the suction flow, so that it is as uniform as possible in all five suction ducts 60.

It should be noted that two or more printing modules 2 flanked along a same conveyor 3 can share the same vacuum generator (vapor extractor), connected to them by flexible tubes.

The shoulder 7 of the basement 4 houses the electrical panel of the machine 1 inside, which is accessed by opening two special hatches 73,74 provided in the rear face of the shoulder 7 itself.

The electrical components of the machine are installed above a special box sliding on the rail (not shown in the figures), which occupies a dedicated compartment formed in the base 6, once it's closed.

A particular orderly arrangement of the cables allows said box to be opened smoothly.

Canisters 75 containing respective printing fluids which are fed to the printing bars 22 are also housed in the base 6 of the basement 4.

The number of canisters 75 corresponds to the number of printing bars 22.

Figure 13:
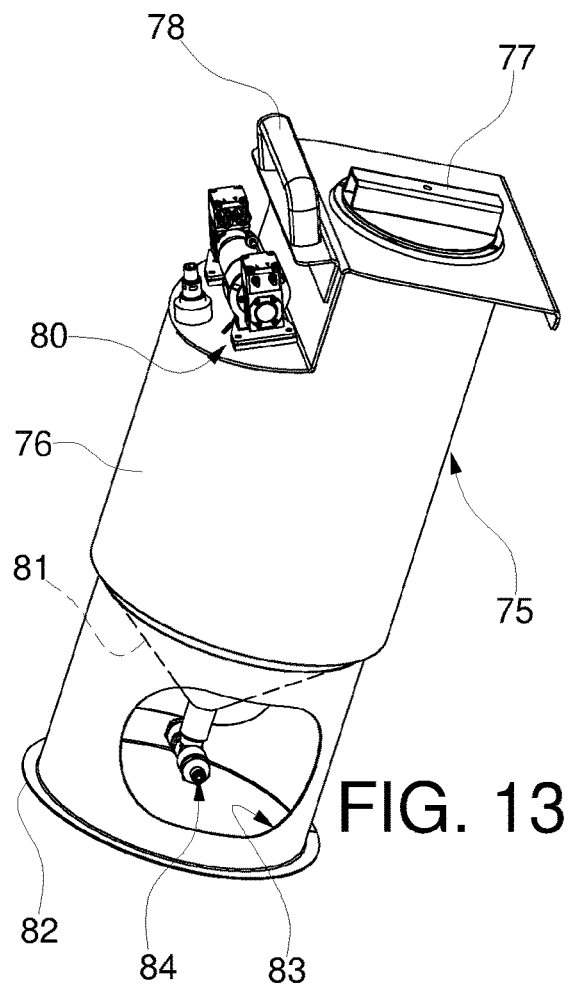
FIG. 13 is a perspective view of one of the canisters of the printing fluids of the machine.
Figure 14:
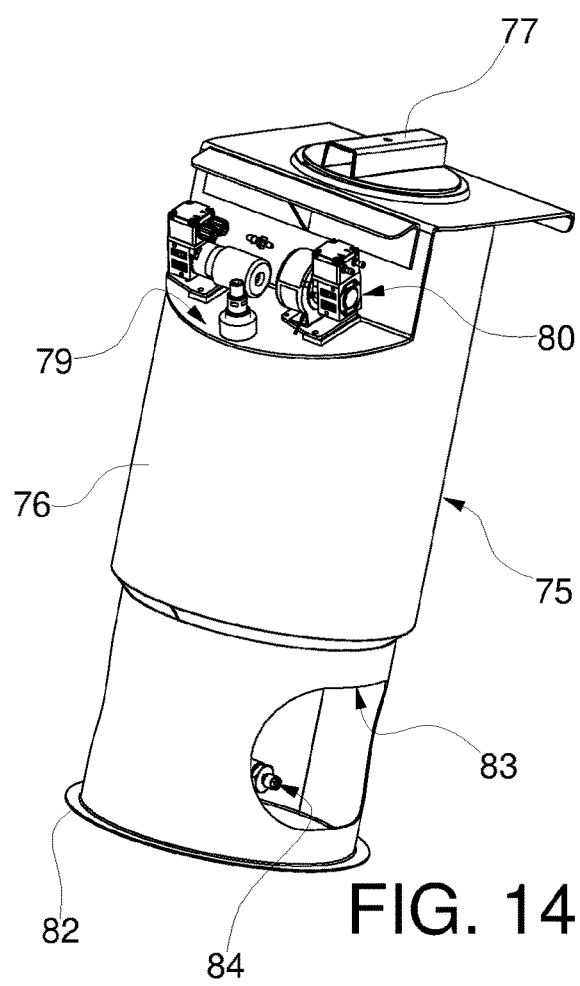
FIG. 14 is another perspective view, from a different angle, of the canister of FIG. 13.
Figure 14A:
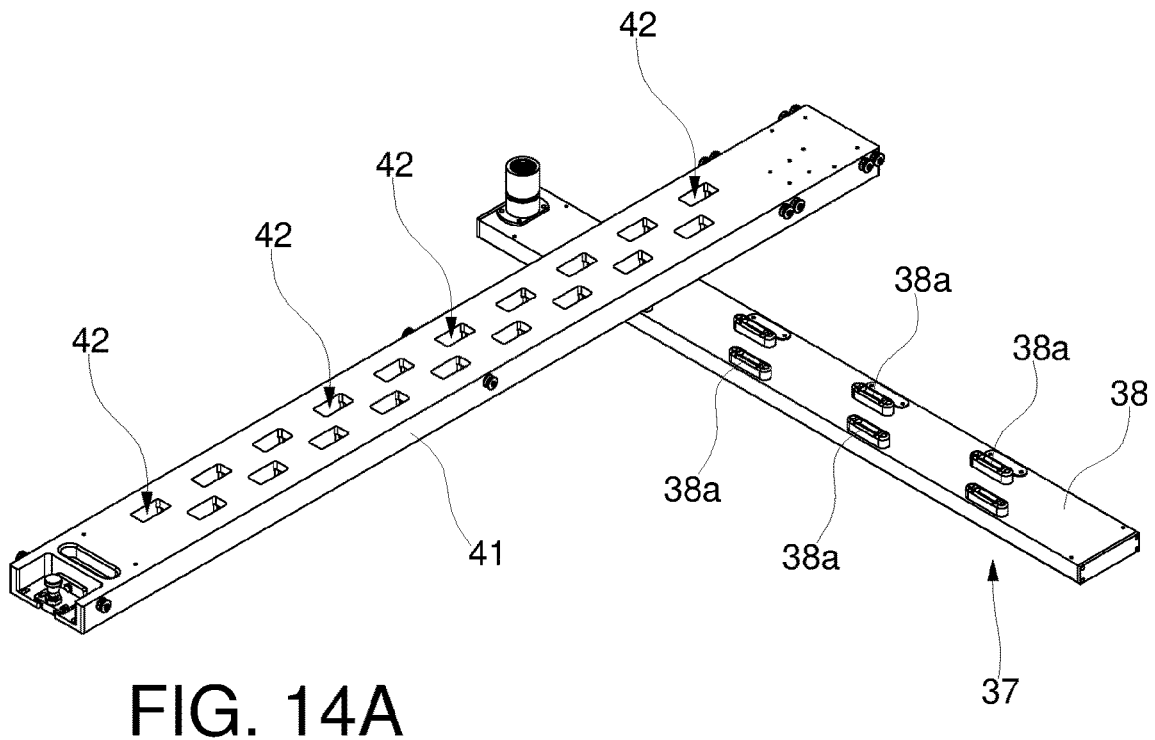
FIG. 14A is a detailed axonometric view of the printing bar heads cleaning device.

Each of the canisters 75 is shown, in detail, in FIGS. 13 and 14.

Each of the canisters 75 comprises a respective container 76, of roughly cylindrical shape.

The container 76 is closed at the top by an ergonomic and easy to operate large-sized cap 77.

A grip handle 78 is also provided at the top of the container 76.

The top of the container 76 shapes a flat surface 79 wherein the components necessary to operate the feeding of the printing fluid on the respective bar 22 (pump, filter, and others) are installed.

Furthermore, according to an aspect of the invention, in order to avoid installing a stirrer to keep the printing fluid moving inside the container 76, a special recirculation pump 80 is provided to continuously or occasionally recirculates the fluid in the canister.

The bottom 81 of the container 76 has a substantially tapered shape, to facilitate the flow of the printing fluid and the cleaning.

In correspondence of said bottom 81, each of the canisters 75 comprises a lower resting portion 82; the lower resting portion 82 is constituted by a sort of ring which comprises a window 83 in correspondence with the discharge orifice 84 of the container 76.

According to an aspect of the invention, the base 6 comprises a tilting housing 85 in which the canisters 75 are kept.

The tilting housing 85 is manually rotatable between two fixed positions, a closing one (as shown, for example, in FIG. 19) and an opening one (shown in FIG. 20). When the tilting housing 85 is brought to the opening position of FIG. 20 (which is inclined, for example, 20° with respect to the closing position), the caps 77 of the canisters 75 are at a conveniently accessible height, to facilitate filling up operations of the printing fluids.

According to another aspect of the invention, the base 6 comprises a supporting element 86 of the front portion in use of the supporting structure 23 of the operating unit 5, for the purpose of greater stiffening and therefore better stability during the operation of the machine 1.

The supporting element 86 can comprise at least one linear actuator, having the fixed part integral with the base 6, and the movable part 87 (i.e., for example the stem) which bears a small plate 88, or other similar component, which can be fixed to the lower face of the supporting structure 23.

The small plate 88 can be associated with said movable part 87 by means of an articulated connection, to compensate for possible small misalignments or displacements between the parts.

According to another aspect of the invention, the conveyor 3 comprises a system 89 to facilitate the replacement of the belt 9 (for example for reasons of excessive wear, but not only).

In particular, this system 89 allows the new belt 9a to be quickly and easily installed after removing the old belt 9b.

For a better understanding, refer to FIGS. 19-22.

The system 89 for facilitating the change of the belt 9 of the conveyor 3 comprises extractable supports 90, which allow the new belt 9a to be supported to facilitate its installation.

Each of the extractable supports 90 comprises, more particularly, a first portion 91 and a second portion 92, orthogonal to each other.

In addition, each of the extractable supports 90 comprises a third portion 93, which is instead sliding coupled to the second portion 92.

The third portion 93 is suitable for resting on the floor.

In the minimum space configuration, the third portion 93 is completely inserted along the second portion 92 (essentially in a telescopic way).

When it is not to be used, each extractable support 90 is housed, in its minimum space configuration, in a respective compartment 94 provided in the front side 13 of the frame 8 of the conveyor 3 (it is therefore a completely hidden housing).

The system 89 for facilitating the change of the belt 9 further comprises extractable connection elements 95 which connect the front side 13 of the frame 8 of the conveyor 3 to the lower portions 15 of the same frame 8.

The extractable connection elements 95 can be constituted, for example, by small pillars or columns, of dimensions suitable for being interposed between the lower surface of the front side 13 and the upper surfaces of the lower portions 15 of the frame 8.

In FIG. 19, the machine is in the initial stage of the replacing procedure of the old belt 9b.

The old belt 9b to be replaced is cut and eliminated; the rollers 10,11 are then loosened.

As shown in FIG. 20, in preparation for inserting the new belt 9a, the extractable supports 90 are extracted from the respective compartments 94.

Furthermore, the tilting housing 85 is brought to the respective open position, while the supporting element 86 is released from the supporting structure 23 (and therefore it moves together with the tilting housing 85), to free the space between the front side 13 and the front portion of the supporting structure 23 itself.

In addition, the control unit 19 is brought to the respective inactive position by rotating the respective arm 21.

Subsequently, the new belt 9a (closed in a loop) is inserted along the first portions 91 of the extractable supports 90 and rests on them (FIG. 21).

Then, the third portions 93 of the extractable supports 90 are removed from the respective second portions 92, so as to rest on the floor.

The removable connection elements 95 are then removed, to allow the new belt 9a to be inserted along the rollers 10,11.

The new belt 9a is then extended so as to embrace the front side 13, and inserted along the rollers 10,11 until it reaches the correct working position (FIG. 22).

The removable connection elements 95 are then repositioned, while the extractable supports 90 are returned in their respective minimum space configuration and again housed in the respective compartments 94.

The new belt 9b is placed in the right tension by acting on the rollers 10, 11.

Finally, the tilting housing 85 and the control unit 19 are rearranged in the respective operating positions.

The operation and the way of use of the machine 1 according to the invention are, in the light of the foregoing, completely intuitive.

The machine 1, being completely modular, can be easily and quickly adapted to different production requirements.

In fact, it is possible to quickly and simply pass from a configuration with four printing bars 22 to eight, or to twelve and even beyond, simply by matching a suitable number of printing modules 2 along a same conveyor 3 of suitable length. This also constitutes an advantage from the point of view of the management of the production plant, since the machine has the minimum space required in relation to the processing to be carried out: in other words, if only four printing bars 22 are required, the installation of a cumbersome machine and comprising a greater number of bars 22 is avoided, which however remain unused for most of the time.

In case of need, the extension of the machine to a version comprising a greater number of bars 22 is, in any case, very easy and economical.

In any case, even in the extended version (for example with eight or twelve printing bars 22) the machine is certainly less cumbersome, and therefore it is easier to manage than other machines on the market.

As disclosed before, the machine 1 according to the invention further allows to obtain numerous other technical advantages, related for example to the maintenance of the heads (thanks to the innovative system for lifting the printing bars 22 for the insertion of a respective collection tank 44), or to replace a worn belt 9.

It has thus been seen how the invention achieves the intended purposes.

The present invention has been described according to preferred embodiments; however, equivalent variants can be conceived without for this reason departing from the scope of protection defined by the following claims.

The invention claimed is:

1. A digital printer machine for ceramic products, the digital printer machine comprising at least one conveyor, suitable for transporting the ceramic products to be printed along a feed direction, and at least one printing module, positioned along said at least one conveyor and comprising an operating unit with respective print heads provided with nozzles for dispensing at least one printing fluid to be deposited on the surface of the ceramic products, characterized in that said at least one printing module comprises a basement provided with a recess, underlying said operating unit, wherein said at least one conveyor is inserted to make the ceramic products pass under said print heads, said basement further comprising two completely flat and free lateral opposite flanks so that said at least one printing module can be matched to other printing modules along said at least one conveyor until a complete mutual matching is obtained,
    wherein the operating unit of each of said at least one printing module comprises a plurality of printing bars, functionally autonomous, flanked along the feed direction of the ceramic products and each suitable for dispensing, on the surface of the ceramic products being processed, a respective printing fluid, and
    wherein said at one conveyor comprises a frame and a belt for feeding the ceramic products through said at least one printing module, and wherein said at least one conveyor comprises a system to facilitate the replacement of the belt, said system comprising extractable supports which allow a new belt to be supported to facilitate its installation.

2. The machine according to claim 1, comprising a plurality of said at least one printing module, arranged in series along said at least one conveyor, with the sides of the respective basements abutting each other.

3. The printer machine according to claim 1, one-of- the previous claims, wherein said basement comprises a ground resting base, and a shoulder rising from said base, said operating unit being associated with the top of said shoulder so as to create a substantially C-shaped structure which at the centre defines said recess.

4. The digital printer machine according to claim 3, wherein each of said plurality of printing bars can be lifted from a lower operating position to an inactive upper position, and vice versa, said machine also comprising at least one collection tank located below each of said plurality of printing bars for head maintenance operations, and wherein each of said plurality of printing bars, when in said inactive upper position, rests on said at least one collection tank so as to isolate the environment wherein the print heads are located.

5. The digital printer machine according to claim 4, wherein said operating unit comprises a supporting structure of each of said plurality of printing bars, and wherein each of said plurality of printing bars comprises a respective supporting framework housing all the necessary components for the operation of each of said plurality of printing bars, said supporting structure comprising lifting means of said respective supportive framework of each of said plurality of printing bars independently of each other.

6. The digital printer machine according to claim 5, wherein said lifting means comprise, for each of said plurality of printing bars, a respective lifting actuator, integral with the inner surface of a roof of said supporting structure, said lifting actuator comprising a fixed portion connected to said roof, and a movable portion associated with the top of said respective supporting framework.

7. The digital printer machine according to claim 6, wherein said lifting actuator is connected to said respective supporting framework of the respective printing bar in a sliding manner, to allow the extraction of each of said plurality of printing bars, for maintenance reasons, in an extended position outside the dimensions of said operating unit.

8. The digital printer machine according to claim 5, wherein said supporting structure comprises lower guides for sliding each of said plurality of printing bars, said at least one collection tank comprising a main portion and two opposite lateral edges protruding laterally from said main portion, said two opposite lateral edges being shaped so as to match on said lower guides when the respective printing bar is in the inactive upper position.

9. The digital printer machine according to claim 8, wherein said main portion comprises a cavity suitable for collecting the fluid emitted by the print heads during the purging/maintenance operations, said cavity communicating with a discharge channel which, in turn, flows into a hole regulated by a tap.

10. The digital printer machine according to claim 5, wherein said supporting structure of said operating unit comprises a back plate, lateral walls, a roof, a lower shelf element and a sealed front door, so as to enclose an environment, wherein said of plurality of printing bars are housed, which can be put in overpressure, ventilated or conditioned.

11. The digital printer machine according to claim 1, wherein each of said extractable supports is housed, in its minimum space configuration, in a respective compartment provided in the front side of said respective supporting framework of said at least one conveyor.

12. The digital printer machine according to claim 1, wherein each of said extractable supports comprises a first portion and a second portion orthogonal to each other, and a third portion, suitable for resting on the floor, sliding coupled to said second portion.

13. A digital printer machine for ceramic products, the digital printer machine comprising at least one conveyor, suitable for transporting the ceramic products to be printed along a feed direction, and at least one printing module, positioned along said at least one conveyor and comprising an operating unit with respective print heads provided with nozzles for dispensing at least one printing fluid to be deposited on the surface of the ceramic products, characterized in that said at least one printing module comprises a basement provided with a recess, underlying said operating unit, wherein said at least one conveyor is inserted to make the ceramic products pass under said print heads, said basement further comprising two completely flat and free lateral opposite flanks so that said at least one printing module can be matched to other printing modules along said at least one conveyor until a complete mutual matching is obtained,
    wherein the operating unit of each of said at least one printing module comprises a plurality of printing bars, functionally autonomous, flanked along the feed direction of the ceramic products and each suitable for dispensing, on the surface of the ceramic products being processed, a respective printing fluid, and
    wherein each printing module comprises a suction system operating in the printing area, comprising a plurality of suction ducts, interposed between the individual printing bars and connected to a vacuum generator.

14. The digital printer machine according to claim 13, wherein each of said suction ducts has a circular or substantially circular cross-section, and comprises a through longitudinal slot.

15. The digital printer machine according to claim 13, wherein each of said suction ducts can be extracted/removed from the front side of the at least one printing module, to carry out cleaning and/or maintenance operations.

16. The digital printer machine according to claim 13, wherein each of said suction ducts comprises, internally, a septum which divides its internal volume into two parts.

17. The digital printer machine according to claim 16, wherein of said suction duct shapes, along its inner surface, longitudinal seats wherein lateral edges of said septum can be selectively inserted.

18. The digital printer machine according to claim 13, wherein said operating unit comprises a supporting structure provided with a shelf element, which in turn comprises a plurality of openings through which the print heads of each printing bar can protrude inferiorly, said openings being defined by a plurality of crossbars inside which said suction ducts are housed.

19. A digital printer machine for ceramic products, the digital printer machine comprising at least one conveyor, suitable for transporting the ceramic products to be printed along a feed direction, and at least one printing module, positioned along said at least one conveyor and comprising an operating unit with respective print heads provided with nozzles for dispensing at least one printing fluid to be deposited on the surface of the ceramic products, characterized in that said at least one printing module comprises a basement provided with a recess, underlying said operating unit, wherein said at least one conveyor is inserted to make the ceramic products pass under said print heads, said basement further comprising two completely flat and free lateral opposite flanks so that said at least one printing module can be matched to other printing modules along said at least one conveyor until a complete mutual matching is obtained, wherein the operating unit of each of said at least one printing module comprises a plurality of printing bars, functionally autonomous, flanked along the feed direction of the ceramic products and each suitable for dispensing, on the surface of the ceramic products being processed, a respective printing fluid, and wherein said basement houses a plurality of canisters which contain respective printing fluids to be supplied to said plurality of printing bars, each of said canisters comprising a container for the printing fluid having a substantially frusto-conical shaped bottom.

20. The digital printer machine according to claim 19, wherein each of said canisters comprises a respective recirculation pump of the printing fluid contained in said container.

21. The digital printer machine according to claim 19, wherein said basement comprises a tilting housing wherein said canisters are kept, which is manually rotatable between two fixed positions, a closing one and an opening one.

* * * * *